United States Patent
Yang et al.

(10) Patent No.: US 9,608,788 B2
(45) Date of Patent: Mar. 28, 2017

(54) METHOD FOR PERFORMING MEASUREMENT AND TERMINAL

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/156,960

(22) Filed: May 17, 2016

(65) Prior Publication Data
US 2016/0262035 A1    Sep. 8, 2016

Related U.S. Application Data

(63) Continuation of application No. 14/417,025, filed as application No. PCT/KR2014/004231 on May 12, 2014, now Pat. No. 9,369,899.
(Continued)

(30) Foreign Application Priority Data

May 12, 2014 (KR) .................. 10-2014-0056647

(51) Int. Cl.
*H04W 24/08* (2009.01)
*H04L 5/00* (2006.01)
*H04J 11/00* (2006.01)
*H04W 72/08* (2009.01)

(52) U.S. Cl.
CPC .......... *H04L 5/005* (2013.01); *H04J 11/0053* (2013.01); *H04L 5/0053* (2013.01);
(Continued)

(58) Field of Classification Search
None
See application file for complete search history.

(56) References Cited

U.S. PATENT DOCUMENTS

2012/0329400 A1   12/2012   Seo et al.
2013/0058234 A1   3/2013    Yang et al.
(Continued)

FOREIGN PATENT DOCUMENTS

KR   10-2013-0038804 A   4/2013
KR   10-2013-0045240 A   5/2013
(Continued)

OTHER PUBLICATIONS

Lindbom et al., "Enhanced Inter-cell Interference Coordination for Heterogeneous Networks in LTE-Advanced: A Survey", ARXIV. org, Dec. 7, 2011, see Abstract, Section 6.2.
(Continued)

*Primary Examiner* — Brian Roberts
(74) *Attorney, Agent, or Firm* — Birch, Stewart, Kolasch & Birch, LLP

(57) ABSTRACT

A method is provided for assisting measurement of a user equipment (UE). The method is performed by a serving cell for the UE. The serving cell determines whether a cell-specific reference signal (CRS) of the serving cell is to collide with a CRS of a second neighbor cell or whether a CRS of a first neighbor cell is not to collide with the CRS of the second neighbor cell, if the serving cell and the first neighbor cell correspond to aggressor cells to the second neighbor cell corresponding to a victim cell. The serving cell generates a second measurement subframe pattern based on an almost blank subframe (ABS) pattern in response to the determination, and transmits the second measurement subframe pattern for the first and second neighbor cells to the UE.

12 Claims, 16 Drawing Sheets

Related U.S. Application Data

(60) Provisional application No. 61/822,414, filed on May 12, 2013.

(52) U.S. Cl.
CPC .......... *H04L 5/0073* (2013.01); *H04L 5/0091* (2013.01); *H04W 72/085* (2013.01); *H04L 5/0032* (2013.01); *H04L 5/0082* (2013.01)

(56) References Cited

U.S. PATENT DOCUMENTS

| | | |
|---|---|---|
| 2013/0121191 A1 | 5/2013 | Song et al. |
| 2013/0128765 A1 | 5/2013 | Yang et al. |
| 2013/0223400 A1 | 8/2013 | Seo et al. |
| 2013/0235743 A1 | 9/2013 | Goldhamer |
| 2013/0279343 A1 | 10/2013 | Jeong et al. |
| 2013/0303152 A1 | 11/2013 | Kim et al. |
| 2014/0192671 A1 | 7/2014 | Lim et al. |

FOREIGN PATENT DOCUMENTS

| | | |
|---|---|---|
| KR | 10-2013-0107158 A | 10/2013 |
| KR | 10-2014-0044366 A | 4/2014 |
| WO | WO 2012/096521 A2 | 7/2012 |
| WO | WO 2013/018990 A1 | 2/2013 |

OTHER PUBLICATIONS

ZTE, "Discussion on CRS interference and CSI measurements in macro-pico deployment", 3GPP TSG RAN WG1 Meeting #63, R1-105969, Jacksonville, United States, Nov. 15-19, 2010, see Abstract, Section 3.

"3rd Generation Partnership Project; Technical Specification Group Radio Access Network; Evolved Universal Terrestrial Radio Access (E-UTRA); Physical Channels and Modulation (Release 11)," 3GPP TS 36.211, V11.2.0, Feb. 2013, pp. 1-109.

LG Electronics, "Discussion on Measurement Pattern in RRM test cases," 3GPP TSG-RAN WG4 Meeting #67, R4-132441, Fukuoka, Japan, May 20-24, 2013, 4 pages.

Qualcomm Incorporated, "UE behavior for CRS interference mitigation," 3GPP TSG-RAN WG4 #66bis, R4-131256, Chicago, IL, Apr. 15-19, 2013, pp. 1-9.

Nokia Siemens Networks et al., "Network assistance for CRS Interference Cancellation", 3GPP TSG-RAN WG2 Meeting #77bis, R2-121617, Jeju, South Korea, Mar. 26-30, 2012, 3 pages.

Nokia Siemens Networks et al., "Remaining issues for signalling support for CRS IC", 3GPP TSG RAN WG1 #69 Meeting, R1-122404, Prague, Czech Republic, May 21-25, 2012, 3 pages.

Qualcomm Incorporated, "Discussion on signaling support for CRS interference handling", 3GPP TSG-RAN WG2 #78, R2-122848, Prague, Czech Republic, May 21-25, 2012, pp. 1-3.

Renesas Mobile Europe Ltd, "Further considerations on signalling support for CRS interference cancellation", 3GPP TSG RAN WG1 Meeting #70, R1-123576, Qingdao, China, Aug. 13-17, 2012, 3 pages.

Samsung, "RRC signalling support for CRS interference handling", 3GPP TSG-RAN2#78 meeting, Tdoc R2-122502, Prague, Czech Republic, May 21-25, 2012, 4 pages.

Huawei et al., "Preliminary Discussion on FeICIC Cell Identification Test Cases", 3GPP TSG-RAN WG4 Meeting #66bis, R4-131088, Chicago, USA, Apr. 15-19, 2013 (downloaded by EPO on Apr. 8, 2013), 5 pages.

Huawei et al., "Preliminary discussion on FeICIC RSRP accuracy test case," 3GPP TSG-RAN WG4 Meeting #66bis, R4-131103, Chicago, USA, Apr. 15-19, 2013 (downloaded by EPO on Apr. 8, 2013), 7 pages.

METHOD FOR PERFORMING MEASUREMENT AND TERMINAL

CROSS-REFERENCE TO RELATED APPLICATIONS

This Application is a Continuation of co-pending U.S. patent application Ser. No. 14/417,025 filed on Jan. 23, 2015, which is filed as the National Phase of PCT/KR2014/004231 filed on May 12, 2014, which claims the benefit under 35 U.S.C. §119(e) to U.S. Provisional Application No. 61/822,414 filed on May 12, 2013, and under 35 U.S.C. §119(a) to Korean Patent Application No. 10-2014-0056647 filed on May 12, 2014, all of which are hereby expressly incorporated by reference into the present application.

BACKGROUND OF THE INVENTION

The present invention relates to a mobile communication.

$3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in a next-generation mobile communication system, it is expected that a small cell having a small cell coverage radius is added within a coverage of a macro cell.

However, such a small cell may lead to a further increase in an interference, and thus a measurement may not be correctly performed.

SUMMARY OF INVENTION

Accordingly, an object of the present invention is to solve the above-mentioned problems.

To achieve the aforementioned object, according to an aspect of the present invention, there is provided a method of performing a measurement. The method may comprise: receiving, from a serving cell, a first measurement subframe pattern for the serving cell and assistance information on cell-specific reference signals (CRSs) of first and second neighbour cells; receiving, from the serving cell, a second measurement subframe pattern for the first and second neighbour cells. Here, if the serving cell and the first neighbour cell correspond to aggressor cells to the second neighbour cell corresponding to a victim cell, if a CRS of the serving cell is collide with a CRS of the second neighbour cell and if the CRS of the first neighbour cell is not collide with the CRS of the second neighbour cell, the received second measurement subframe pattern is set based on an almost blank subframe (ABS) pattern. The method may comprise: performing a measurement for the first and second neighbour cells based on the second measurement subframe pattern.

To achieve the aforementioned object, according to another aspect of the present invention, there is provided a user equipment for performing a measurement. The user equipment may comprise: a receiver for receiving a first measurement subframe pattern for the serving cell and assistance information on cell-specific reference signals (CRSs) of first and second neighbour cells, and a second measurement subframe pattern for the first and second neighbour cells. Here, if the serving cell and the first neighbour cell correspond to aggressor cells to the second neighbour cell corresponding to a victim cell, if a CRS of the serving cell is collide with a CRS of the second neighbour cell and if the CRS of the first neighbour cell is not collide with the CRS of the second neighbour cell, the received second measurement subframe pattern for the first and second neighbour cells is set based on an almost blank subframe (ABS) pattern. The user equipment may comprise: a controller for performing a measurement for the first and second neighbour cells based on the second measurement subframe pattern.

The received second measurement subframe pattern may be set to a subset of the ABS pattern. The received second measurement subframe pattern may be set to the same as the ABS pattern.

A cell identifier (ID) of the serving cell and a cell ID of the second neighbour cell have the same remainder of a modulo 6, whereas a cell ID of the first serving cell has a different remainder of the modulo 6.

The CRS of the first neighbour cell does not collide with the CRS of the serving cell.

According to an aspect of the present invention, a measurement can be performed more effectively and accurately.

BRIEF DESCRIPTION OF THE DRAWINGS

FIG. 13b shows an example in which a CRS collides in the environment of FIG. 13a.

FIG. 14 shows an example of a change in an environment of FIG. 13a.

DETAILED DESCRIPTION OF THE EMBODIMENTS

Figure 1:
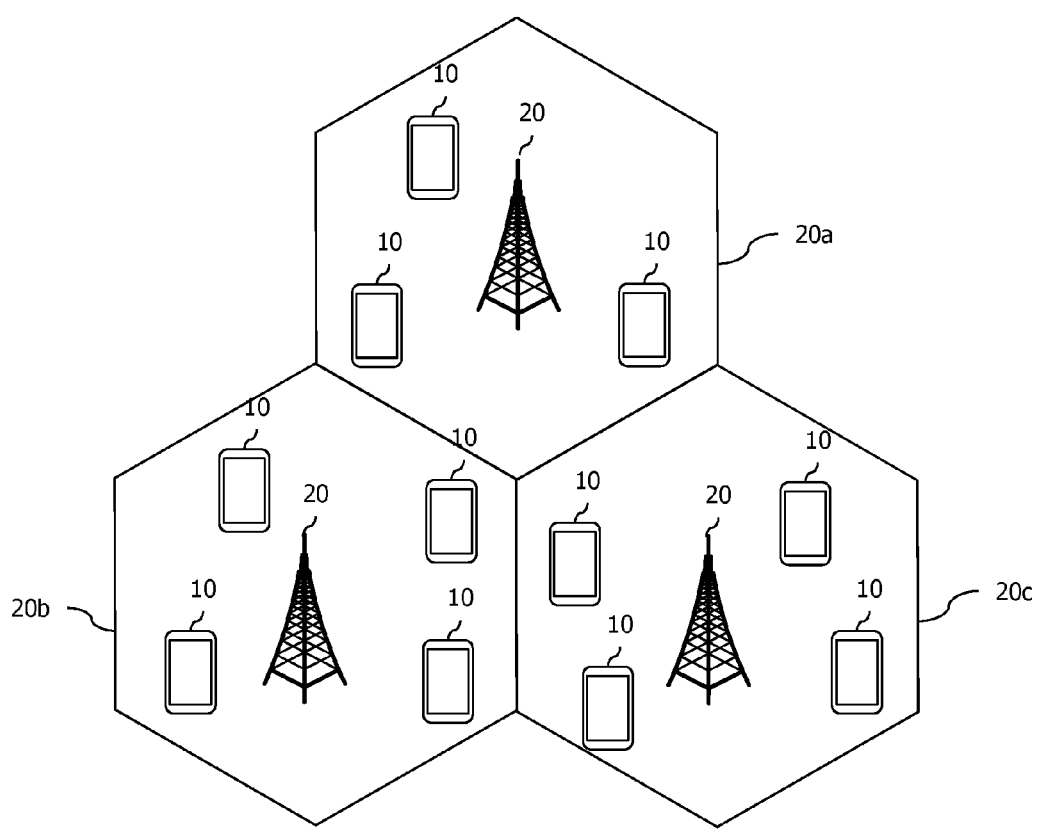
FIG. 1 shows a wireless communication system.

The present invention described hereinafter is applied on the basis of $3^{rd}$ generation partnership project (3GPP) long term evolution (LTE) or 3GPP LTE-Advanced (LTE-A). This is for exemplary purposes only, and thus the present invention is applicable to various communication systems. In the following description, LTE and/or LTE-A are collectively referred to as LTE.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein are erroneous and thus fail to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having", etc., are intended to indicate the existence of all of several constitutional elements or several steps disclosed in the specification, and are not intended to preclude the possibility that some of the constitutional elements or some of the steps may not exist or additional constitutional elements or steps may further exist.

It will be understood that although the terms "first" and "second" are used herein to describe various constitutional elements, these constitutional elements should not be limited by these terms. These terms are only used to distinguish one constitutional element from another constitutional element. For example, a first constitutional element may be termed a second constitutional element, and similarly, the second constitutional element may be termed the first constitutional element without departing from the scope of the present invention.

When a constitutional element is mentioned as being "connected" to or "accessing" another constitutional element, this may mean that it is directly connected to or accessing the other constitutional element, but it is to be understood that there are no intervening constitutional elements present. On the other hand, when a constitutional element is mentioned as being "directly connected" to or "directly accessing" another constitutional element, it is to be understood that there are no intervening constitutional elements present.

Hereinafter, exemplary embodiments of the present invention will be described with reference to the accompanying drawings. It is to be noted that like reference numerals denote the same constitutional elements in the drawings, and a detailed description of a known structure or function of the present invention will be omitted herein if it is deemed to obscure the subject matter of the present invention. In the following description, well-known functions or constructions are not described in detail since they would obscure the invention in unnecessary detail. The exemplary embodiments should be considered in descriptive sense only and not for purposes of limitation, and do not intend to limit technical scopes of the present invention. However, it is to be understood that the invention is not limited to the disclosed embodiments, but, on the contrary, is intended to cover various modifications and equivalent arrangements included within the spirit and scope of the appended claims.

A term 'base station (BS)' used hereinafter is generally a fixed station which communicates with a wireless device and may be referred to as another term, such as an evolved-nodeB (eNodeB), an evolved node-B (eNB), a base transceiver system (BTS), an access point, etc.

Further, a term 'user equipment (UE)' used hereinafter may be fixed or mobile, and may be referred to as another term, such as a device, a wireless device, a terminal, a mobile station (MS), a user terminal (UT), a subscriber station (SS), a mobile terminal (MT), etc.

FIG. 1 shows a wireless communication system.

Referring to FIG. 1, a wireless communication system includes at least one base station (BS) 20. Respective BSs 20 provide communication services to specific geographical regions (generally referred to as cells) 20a, 20b, and 20c. The cell can be divided into a plurality of regions (referred to as sectors).

The UE belongs to one cell in general. A cell to which the UE belongs is called a serving cell. A BS which provides a communication service to the serving cell is called a serving BS. Since the wireless communication system is a cellular system, there may be a different cell adjacent to the serving cell. The different cell adjacent to the serving cell is called a neighbour cell. A BS which provides a communication service to the adjacent cell is called a neighbour BS. The serving cell and the neighbour cell are determined relatively with respect to the UE.

Hereinafter, a downlink implies a communication from the BS 20 to a UE 10, and an uplink implies a communication from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

Meanwhile, the wireless communication system may be any one of a multiple-input multiple-output (MIMO) system, a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas. Hereinafter, a Tx antenna implies a physical or logical antenna used to transmit one signal or stream. An Rx antenna implies a physical or logical antenna used to receive one signal or stream.

Figure 2:
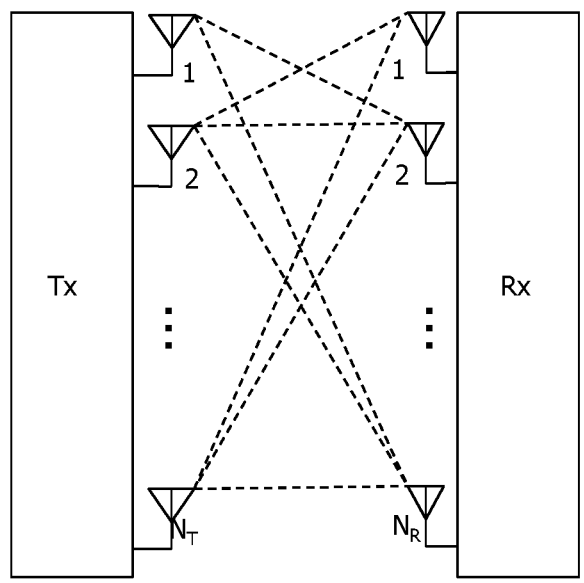
FIG. 2 shows an antenna structure of a typical multi-antenna system.

FIG. 2 shows an antenna structure of a typical multi-antenna system.

If the number of transmit (Tx) antennas and the number of receive (Rx) antennas are simultaneously increased to NT and NR respectively as shown in FIG. 2 unlike a case where a plurality of antennas are used in only a transmitter or a receiver, a channel transmission capacity is theoretically increased in proportion to the number of antennas. Therefore, a data transfer rate (or a transmission rate) can be improved and spectral efficiency can be remarkably improved.

As the channel transmission capacity is increased, the data transfer rate can be theoretically increased by a value obtained by multiplying a rate increment rate $R_i$ to be described below by a maximum data transfer rate $R_o$ for a case of using a single antenna. That is, for example, a MIMO communication system using 4 Tx antennas and 4 Rx antennas can theoretically obtain a data transfer rate which is 4 times higher than that of a single antenna system.

Ever since a theoretical capacity increase of a multi-antenna system was proved in the mid 90's, a variety of technologies for improving an actual data transfer rate have been actively under research. Among them, several technologies have already been applied to various wireless communication standards such as $3^{rd}$ generation mobile communication, next-generation wireless LAN, etc.

$$R_i = \min(N_T, N_R) \quad \text{[Equation 1]}$$

Research on multiple antennas has actively been underway up to now in various aspects such as research on an information theory related to calculation of multi-antenna communication capacity or the like in various channel environments and multiple access environments, research on measuring of a wireless channel of a multi-antenna system and modeling thereof and research on space-time signal processing technique for improving transmission reliability and a data transfer rate.

In a structure of a user equipment (UE) having a general MIMO channel environment, an Rx signal incoming to each Rx antenna can be expressed by Equation 2 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 2]}$$

$$Hx + n$$

Herein, a channel between each of a Tx antenna and an Rx antenna can be identified according to a Tx/Rx antenna index. A channel passing from a Tx antenna j to an Rx antenna i is denoted by $h_{ij}$. In case of using a precoding scheme in transmission similarly to LTE, a Tx signal x can be expressed by Equation 3 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 3]}$$

$$W\hat{s} = WPs$$

Herein, $h_{ij}$ of a precoding matrix W denotes a weight between an i-th Tx antenna and j-th Tx information. In this case, if Tx power of each Tx signal is denoted by $P_1, P_2, \ldots, P_{N_T}$, transmission information having adjusted Tx power can be expressed by a diagonal matrix P of Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, a wireless communication system can be briefly classified into a system based on a frequency division duplex (FDD) scheme and a system based on a time division duplex (TDD) scheme. In the FDD scheme, an uplink transmission and a downlink transmission are achieved while occupying different frequency bands. In the TDD scheme, an uplink transmission and a downlink transmission are achieved at different times while occupying the same frequency band. A channel response based on the TDD scheme is reciprocal in practice. This implies that a downlink channel response is almost identical to an uplink channel response in a given frequency domain. Therefore, in a TDD-based wireless communication system, the downlink channel response can be advantageously obtained from the uplink channel response. In the TDD scheme, a full frequency band is time-divided into the uplink transmission and the downlink transmission, and thus the downlink transmission performed by a BS and the uplink transmission performed by a UE can be simultaneously achieved. In a TDD system in which the uplink transmission and the downlink transmission are divided on a subframe basis, the uplink transmission and the downlink transmission are performed in different subframes.

Hereinafter, an LTE system will be described in greater detail.

Figure 3:
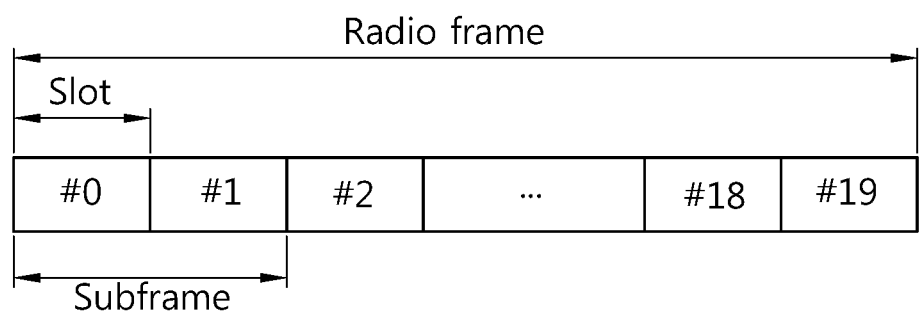
FIG. 3 shows a structure of a frequency division duplex (FDD)-based radio frame in 3rd generation partnership project (3GPP) long term evolution (LTE).

FIG. 3 shows a structure of an FDD-based radio frame in 3GPP LTE.

The radio frame of FIG. 3 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 3, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 4:
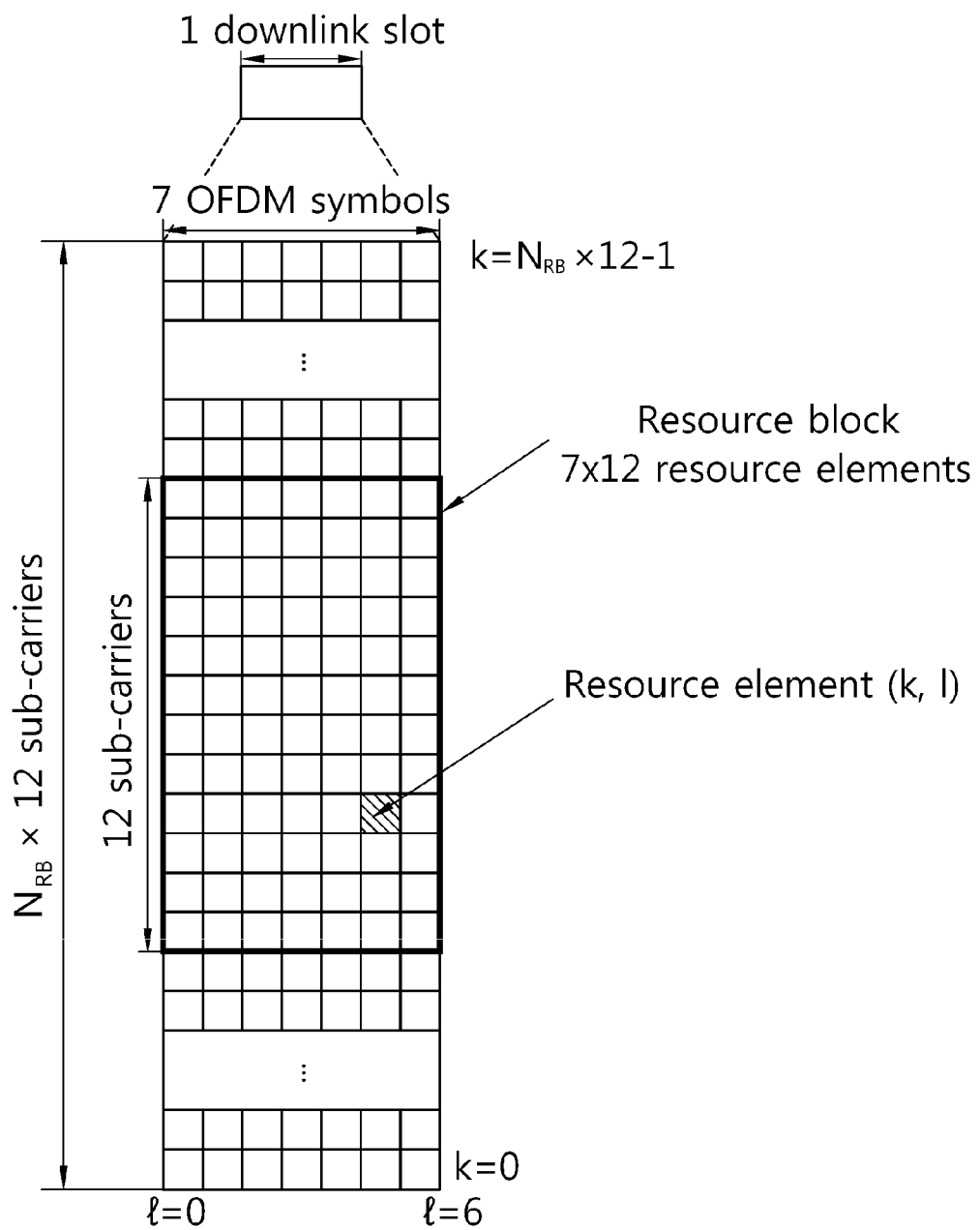
FIG. 4 shows an example of a resource grid for one uplink or downlink slot in 3GPP LTE.

FIG. 4 shows an example of a resource grid for one uplink or downlink slot in 3GPP LTE.

Referring to FIG. 4, an uplink slot includes a plurality of orthogonal frequency division multiplexing (OFDM) symbols in a time domain, and includes NRB resource blocks (RBs) in a frequency domain. For example, the number of RBs, i.e., NRB, may be any one value in the range of 6 to 110 in an LTE system.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. The number of subcarriers or the number of OFDM symbols included in the RB may change variously. That is, the number of OFDM symbols may change depending on the aforementioned CP length. In particular, in 3GPP LTE, it is defined such that 7 OFDM symbols are included in one slot in a normal CP case, and 6 OFDM symbols are included in one slot in an extended CP case.

The OFDM symbol represents one symbol period. The OFDM symbol can also be referred to as an SC-FDMA symbol, an OFDMA symbol, or a symbol period according to a system. As a resource allocation unit, the RB includes a plurality of subcarriers in the frequency domain. The number NUL of RBs included in an uplink slot depends on an uplink transmission bandwidth defined in a cell. Each element on the resource grid is referred to as a resource element.

Meanwhile, the number of subcarriers in one OFDM symbol may be selected from 128, 256, 512, 1024, 1536, and 2048.

A resource grid for one uplink slot in 3GPP LTE of FIG. 4 may also apply to a resource grid for a downlink slot.

Figure 5:
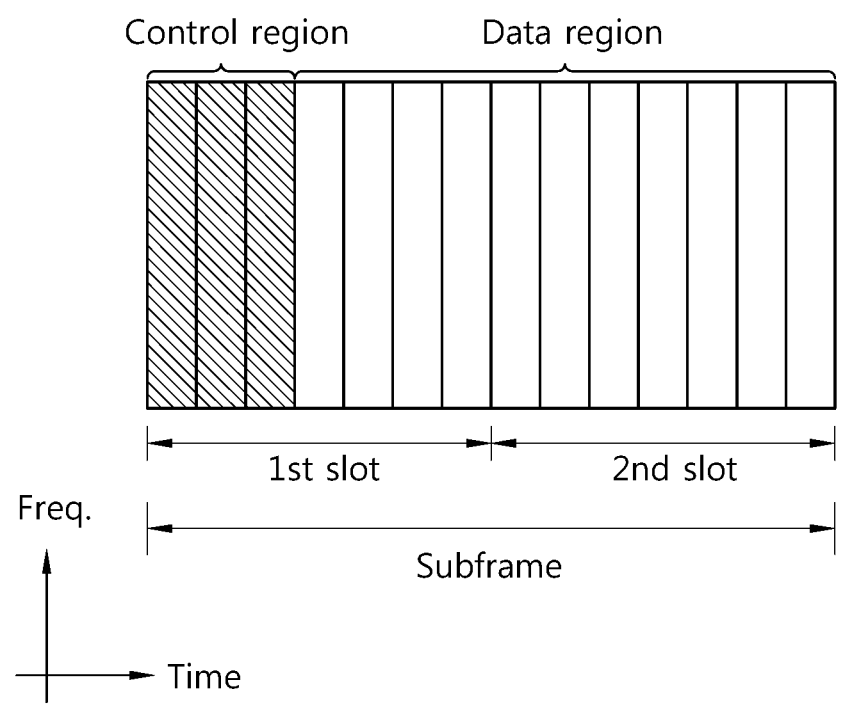
FIG. 5 shows a structure of a downlink subframe.

FIG. 5 shows a structure of a downlink subframe.

It is shown in FIG. 5 that 7 OFDM symbols are included in one slot for example by assuming a normal CP case. However, the number of OFDM symbols included in one slot may vary depending on a CP length. That is, as described above, according to 3GPP TS 36.211 V10.4.0, one slot includes 7 OFDM symbols in case of a normal CP, and one slot includes 6 OFDM symbols in case of an extended CP.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A downlink (DL) subframe is divided into a control region and a data region in the time domain. The control region includes up to first three OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

In 3GPP LTE, a physical channel may be divided into a data channel and a control channel. The data channel may be a physical downlink shared channel (PDSCH) and a physical uplink shared channel (PUSCH). The control channel may be a physical downlink control channel (PDCCH), a physical control format indicator channel (PCFICH), a physical hybrid-ARQ indicator channel (PHICH), and a physical uplink control channel (PUCCH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

A physical downlink control channel (PDCCH) can carry a downlink shared channel (DL-SCH)'s resource allocation and transmission format, uplink shared channel (UL-SCH)'s resource allocation information, paging information on a paging channel (PCH), system information on a DL-SCH, a resource allocation of a higher layer control message such as a random access response transmitted through a PDSCH, a transmission power control command for individual UEs included in any UE group, activation of a voice over Internet (VoIP), etc. A plurality of PDCCHs can be transmitted in the control region, and the UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

A BS determines a PDCCH format according to downlink control information (DCI) to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

In 3GPP LTE, blind decoding is used to detect a PDCCH. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking. A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH.

The uplink channel includes a PUSCH, a PUCCH, a sounding reference signal (SRS), and a physical random access channel (PRACH).

Figure 6:
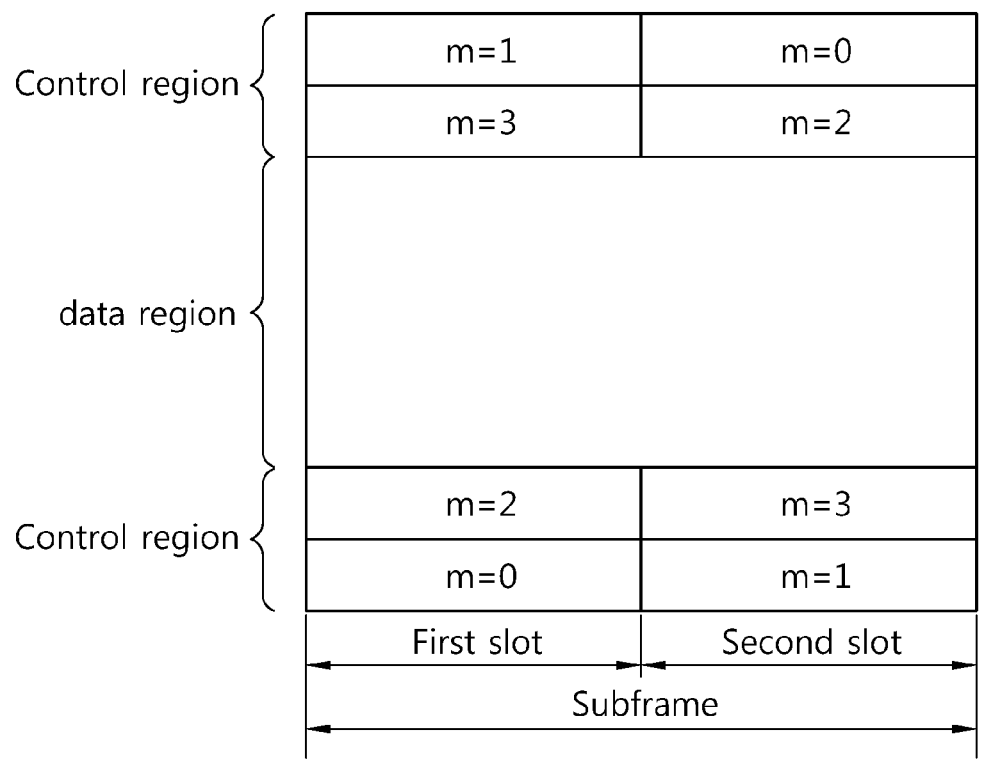
FIG. 6 shows a structure of an uplink subframe in 3GPP LTE.

FIG. 6 shows a structure of an uplink subframe in 3GPP LTE.

Referring to FIG. 6, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel state information (CSI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH. Examples of the control information to be multiplexed with data may include a channel quality indicator (CQI), a precoding matrix indicator (PMI), HARQ, a rank indicator (RI), etc. Alternatively, the uplink data may consist of only the control information.

Now, a carrier aggregation system is described.

Figure 7:
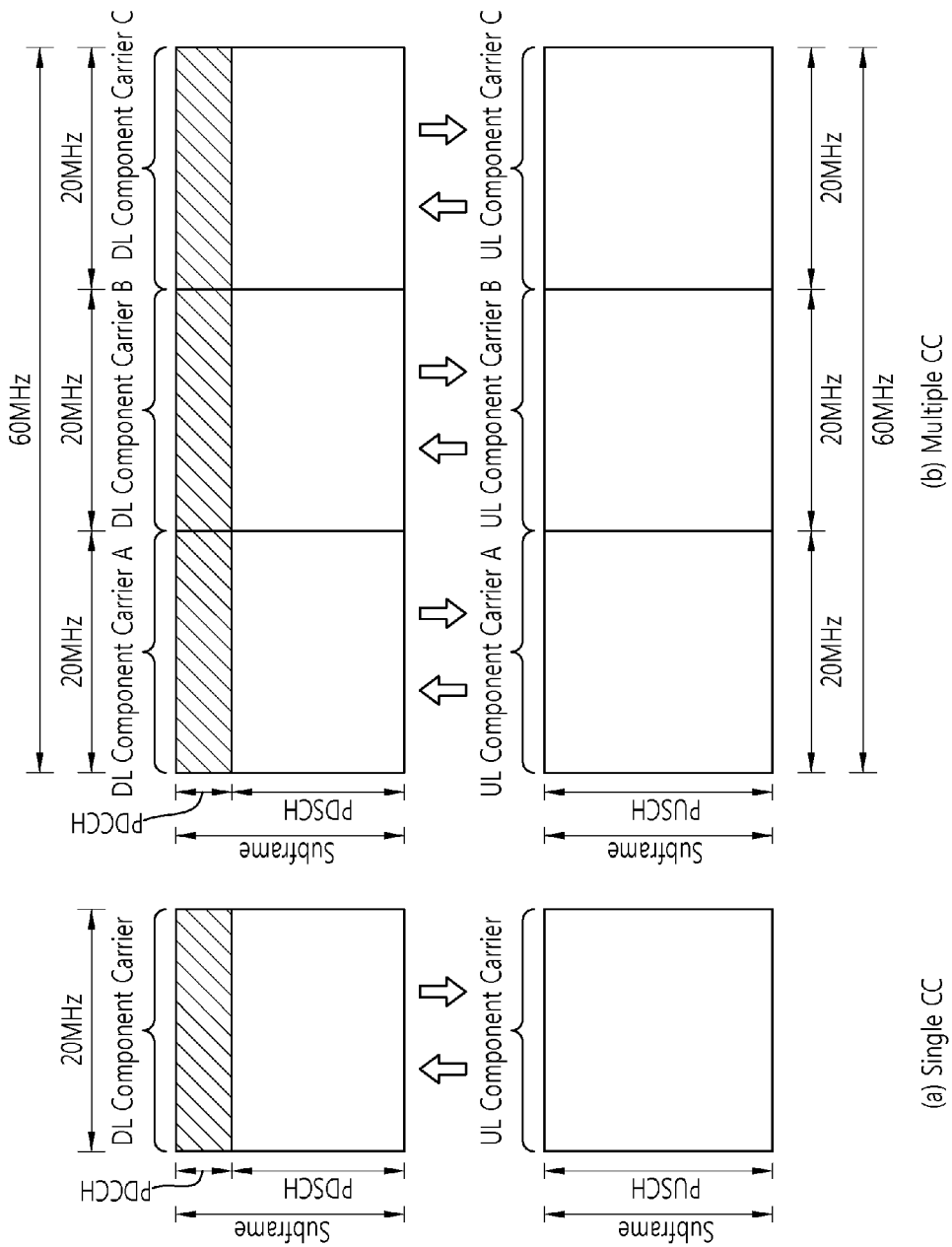
FIG. 7 shows an example of comparing a single carrier system and a carrier aggregation system.

FIG. 7 shows an example of comparing a single carrier system and a carrier aggregation system.

Referring to FIG. 7(a), the single carrier system supports only one carrier as to a UE in an uplink and a downlink. Although the carrier may have various bandwidths, only one carrier is assigned to the UE. Meanwhile, multiple component carriers (CCs), i.e., DL CCs A to C and UL CCs A to C, can be assigned to the UE in the carrier aggregation (CA) system. The CC implies a carrier used in the CA system, and may be simply referred to as a carrier. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included. The number of aggregated CCs may be set differently between the downlink and the uplink. Symmetric aggregation is achieved when the number of DL CCs is equal to the number of UL CCs. Asymmetric aggregation is achieved when the number of DL CCs is different from the number of UL CCs.

A CC which is a target when aggregating one or more CCs may directly use a bandwidth that is used in the legacy system in order to provide backward compatibility with the legacy system. For example, a 3GPP LTE system may support a carrier having a bandwidth of 1.4 MHz, 3 MHz, 5 MHz, 10 MHz, 15 MHz, and 20 MHz, and a 3GPP LTE-A system may configure a wideband of 20 MHz or higher by using each carrier of the 3GPP LTE system as a CC. Alternatively, the wideband may be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if a carrier aggregation (CA) is not considered, uplink and downlink frequency resources may always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration may exist in an activation or deactivation state. Herein, the activation implies that data transmission or reception is performed or is in a ready state. The UE may monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE may receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

The primary cell implies a cell which operates at a primary frequency, and also implies a cell which performs an initial connection establishment procedure or a connection re-establishment procedure or a cell indicated as the primary cell in a handover procedure.

The secondary cell implies a cell which operates at a secondary frequency, and is configured when an RRC connection is once established and is used to provide an additional radio resource.

The serving cell is configured with the primary cell when a carrier aggregation is not configured or when a UE cannot provide the carrier aggregation. If the carrier aggregation is configured, the term 'serving cell' is used to indicate a cell configured to the UE, and may consist of a plurality of cells. One serving cell may consist of one DL CC or a pair of {DL CC, UL CC}. The plurality of serving cells may consist of a set consisting of a primary cell and one or more of all secondary cells.

As described above, the carrier aggregation system can support a plurality of component carriers (CCs), that is, a plurality of serving cells, unlike a single-carrier system.

The carrier aggregation system can support cross-carrier scheduling. The cross-carrier scheduling is a scheduling method capable of performing resource allocation of a PDSCH transmitted by using a different carrier through a PDCCH transmitted via a specific CC and/or resource allocation of a PUSCH transmitted via another CC other than a CC basically linked to the specific CC. That is, the PDCCH and the PDSCH can be transmitted through different DL CCs, and the PUSCH can be transmitted via a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

The carrier aggregation system supporting the cross-carrier scheduling may include a CIF in the conventional downlink control information (DCI) format. In a system supporting the cross-carrier scheduling, e.g., an LTE-A system, the CIF is added to the conventional DCI format (i.e., the DCI format used in LTE) and thus the number of bits can be extended by 3 bits, and the PDCCH structure can reuse the conventional coding scheme, resource allocation scheme (i.e., CCE-based resource mapping), etc.

Meanwhile, various reference signals (RSs) are transmitted in a subframe.

In general, a reference signal (RS) is transmitted as a sequence. Any sequence may be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink reference signal (RS) can be classified into a cell-specific RS (CRS), a Multimedia Broadcast and multicast Single Frequency Network (MBSFN) RS, a UE-specific RS (URS), a positioning RS (PRS), and a channel state information (CSI) RS (CSI-RS). The CRS is an RS transmitted to all UEs in a cell. The CRS can be used in channel measurement for a CQI feedback and in channel estimation for a PDSCH. The MBSFN RS can be transmitted in a subframe allocated for MBSFN transmission. The URS is an RS received by a specific UE or a specific UE group in the cell, and can also be called a demodulation RS (DM-RS). The DM-RS is primarily used in data demodulation of a specific UE or a specific UE group. The PRS may be used for location estimation of the UE. The CSI-RS is used in channel estimation for a PDSCH of an LTE-A UE. The CRI-RS is relatively sparsely arranged in a frequency domain or a time domain. The CSI-RS can be punctured in a data region of a normal subframe or an MBSFN subframe.

Figure 8:
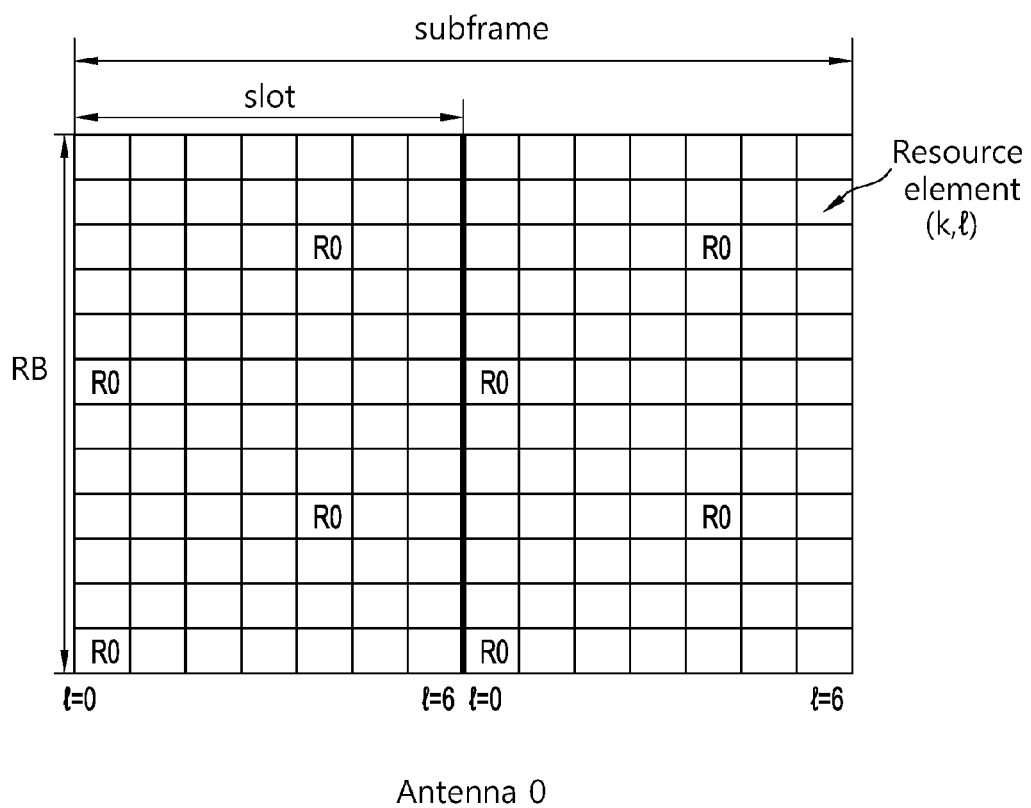
FIG. 8 shows an example of a pattern in which a cell-specific reference signal (CRS) is mapped to a resource block (RB) when a base station (BS) uses one antenna port.

FIG. 8 shows an example of a pattern in which a CRS is mapped to an RB when a BS uses one antenna port.

Referring to FIG. 8, R0 denotes an RE to which a CRS transmitted using an antenna port number 0 of a BS is mapped.

The CRS is transmitted in all downlink subframes in a cell which supports a PDSCH transmission. The CRS may be transmitted on antenna ports 0 to 3. The CRS may be defined only for $\Delta f = -15$ kHz. A pseudo-random sequence $r_{l,ns}(m)$ generated from a seed value based on a cell identity (ID) is subjected to resource mapping to a complex-valued modulation symbol $a^{(p)}_{k,l}$. Herein, n, denotes a slot number in one radio frame, p denotes an antenna port, and l denotes an OFDM symbol number in a slot. k denotes a subcarrier index. l and k are expressed by the following equation.

$$k = 6m + (v + v_{shift}) \bmod 6 \qquad [\text{Equation 5}]$$

$$l = \begin{cases} 0, N_{symb}^{DL} - 3 & \text{if } p \in \{0, 1\} \\ 1 & \text{if } p \in \{2, 3\} \end{cases}$$

$$v_{shift} = N_{ID}^{cell} \bmod 6$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

In the above equation, p denotes an antenna port, and ns denotes a slot number 0 or 1.

k has 6 shifted indices according to a cell ID ($N^{Cell}_{ID}$). Accordingly, cells having cell IDs 0, 6, 12, etc., which are a multiple of 6, transmit a CRS in the same subframe position k.

In the above equation, l is determined according to the antenna port p, and a possible value for l is 0, 4, 7, 11. Accordingly, the CRS is transmitted on symbols 0, 4, 7, and 11.

A resource element (RE) allocated to a CRS of one antenna port cannot be used in a transmission of another antenna port, and must be set to zero. Further, in a multicast-broadcast single frequency network (MBSFN) subframe, the CRS is transmitted only in a non-MBSFN region.

Figure 9A:
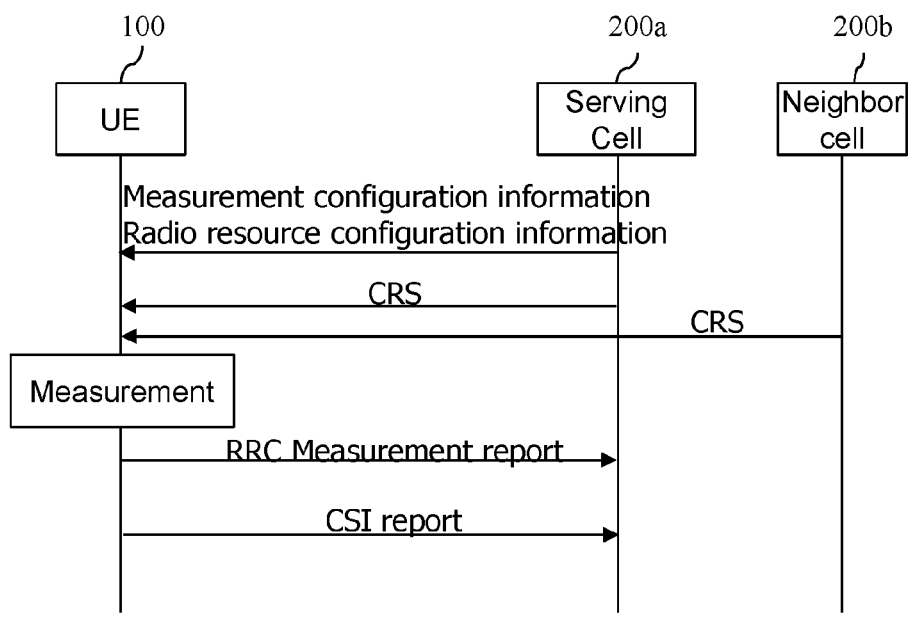
FIG. 9a shows measurement and measurement reporting procedures.

FIG. 9a shows measurement and measurement reporting procedures.

It is necessary for a mobile communication system to support a mobility of a UE 100. Therefore, the UE 100 persistently measures quality for a serving cell which currently provides a service and quality for a neighbour cell. The UE 100 reports a measurement result to a network at a proper time, and the network provides an optimal mobility to the UE through a handover or the like. A measurement performed for such a purpose is ordinarily called a radio resource management (RRM).

Meanwhile, the UE 100 monitors downlink quality of a primary cell (Pcell) on the basis of a CRS. This is called radio link monitoring (RLM). For the RLM, the UE 100 estimates the downlink quality, and compares it with thresholds (e.g., Qout and Qin) of the estimated downlink quality. The threshold Qout is defined as a level at which a downlink cannot be received reliably, and this corresponds to a 10% error of a PDCCH transmission by considering a PCFICH error. The threshold Qin is defined as a level at which the downlink is significantly reliable in comparison with Qout, and this corresponds to a 2% error of the PDCCH transmission by considering the PCFICH error.

As can be seen with reference to FIG. 9a, if each of a serving cell 200a and a neighbour cell 200b transmits a cell-specific reference signal (CRS) to the UE 100, the UE 100 performs a measurement through the CRS, and transmits an RRC measurement report message including a measurement result thereof to the serving cell 200a.

In this case, the UE 100 may perform the measurement by using three methods described below.

1) Reference signal received power (RSRP): It indicates average reception power of all REs which carry a CRS transmitted through the entire band. In this case, average reception power of all REs which carry a CSI RS may be measured instead of the CRS.

2) Received signal strength indicator (RSSI): It indicates reception power measured in the entire band. The RSSI includes all of a signal, an interference, and a thermal noise.

3) Reference symbol received quality (RSRQ): It indicates a CQI, and may be determined as a different RSRP/RSSI according to a measurement bandwidth or subband. That is, the RSRQ implies a signal-to-noise interference ratio (SINR). Since the RSRP cannot provide sufficient mobility information, the RSRQ may be used in a handover and a cell reselection instead of the RSRP.

It may be calculated as RSRQ=RSSI/RSSP.

Meanwhile, the UE 100 receives a measurement configuration information element (IE) from the serving cell 200a for the measurement. A message including the measurement configuration IE is called a measurement configuration message. Herein, the measurement configuration IE may also be received through an RRC connection reconfiguration message. When the measurement result satisfies a report condition in measurement configuration information, the UE reports a measurement result to a BS. The message including the measurement result is called a measurement report message.

The measurement configuration IE may include measurement object information. The measurement object information is information regarding an object for which a measurement is performed by the UE. The measurement object includes at least one of an intra-frequency measurement object which is an object of an intra-frequency measurement, an inter-frequency measurement object which is an object of an inter-frequency measurement, and an inter-RAT measurement object which is an object of an inter-RAT measurement. For example, the intra-frequency measurement object may indicate a neighbour cell having the same frequency band as a frequency band of a serving cell, the inter-frequency measurement object may indicate a neighbour cell having a frequency band different from a frequency band of the serving cell, and the inter-RAT measurement object may indicate a neighbour cell having an RAT different from an RAT of the serving cell.

Specifically, the measurement configuration IE includes IEs shown in the following table.

TABLE 1

MeasConfig ::=
-- Measurement objects
    measObjectToRemoveList
    measObjectToAddModList The measurement objects IE includes measObjectToRemoveList which indicates a list of measObject to be removed and measObjectToAddModList which indicates a list to be newly added or to be modified.

The measObject includes MeasObjectCDMA2000, MeasObjectEUTRA, MeasObjectGERAN, etc., according to a communication technique.

Meanwhile, the MeasObjectEUTRA IE includes information applied for an intra-frequency or an inter-frequency as to a measurement of an E-UTRA cell. The MeasObjectEUTRA IE is expressed by the following table.

TABLE 2

1) MeasObjectEUTRA
- neighCellConfig
-    measSubframePatternConfigNeigh-r10
2) Meas SubframePatternConfigNeigh-r10
    measSubframePatternNeigh-r10
    measSubframeCellList-r10

The MeasObjectEUTRA IE is expressed more specifically by the following table.

TABLE 3

| Description on MeasObjectEUTRA field |
|---|
| carrierFreq<br>To identify an E-UTRA carrier frequency at which this configuration is valid.<br>neighCellConfig<br>To indicate configuration information of a neighbour cell.<br>measCycleSCell<br>Parameter: $T_{measure\_scc}$<br>This parameter is used when a secondary cell (SCell) operates on a frequency indicated by measObject and is in an inactive state.<br>measSubframeCellList<br>This is a list of cells to which measSubframePatternNeigh is applied. If not included, a UE assumes that a time domain measurement resource restritiction pattern is applied to all neighbour cells.<br>measSubframePatternNeigh<br>This is a time domain measurement resource restriction pattern used when an RSRP and an RSRQ are measured for a neighbour cell on a carrier frequency indicated by the carrierFreq. |

As described above, the MeasObjectEUTRA IE includes configuration information of a neighbour cell (i.e., NeighCellConfig) and a time domain measurement resource restriction pattern (i.e., measSubframePatternNeigh) used to measure an RSRP and an RSRQ for the neighbour cell and a cell list (i.e., measSubframeCellList) to which the pattern is applied.

Meanwhile, the UE 100 also receives a radio resource configuration IE as illustrated.

The radio resource configuration dedicated IE is used to configure/modify/release a radio bearer or is used to modify a MAC configuration. The radio resource configuration dedicated IE includes subframe pattern information. The subframe pattern information is information regarding a measurement resource restriction pattern on a time domain for measuring an RSRP and an RSRQ as to a primary cell (PCell).

The radio resource configuration IE includes fields shown in the following table.

TABLE 4

- RadioResourceConfigDedicated
- measSubframePatternPCell-r10

The RadioResourceConfigDedicated field includes the following parameters.

TABLE 5

Descritioon on radioResourceConfigDedicated field logicalChannelConfig
It is used to select whether a logical channel configuration is explicitly signaled for SRBs or a default logical channel configuration is configured for an SRB1.
logicalChannelIdentity
A logical channel identifier for identifying both of an uplink (UL) and a downlink (DL).
mac-MainConfig
This is an option used to indicate whether mac-MainConfig is explicitly signaled or a default MAC main configuration is configured.
measSubframePatternPCell
A time domain measurement resource restriction pattern for performing a measurement (RSRP, RSRQ) as to a primary cell (PCell, i.e., a first cell) (or a serving cell).

As described above, the RadioResourceConfigDedicated field includes measSubframePatternmPCell or measSubframePattern-Serv which indicates a time domain measurement resource restriction pattern for performing a measurement (RSRP, RSRQ) as to the primary cell (PCell, i.e., a first cell) (or a serving cell).

Figure 9B:
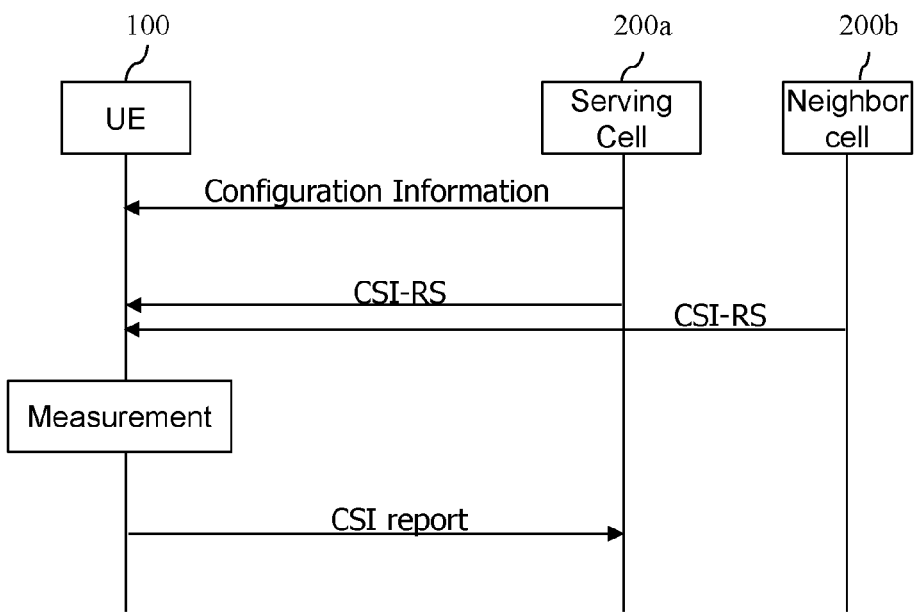
FIG. 9b shows a channel state information reporting procedure.

FIG. 9b shows a channel state information reporting procedure.

Channel state information (CSI) is an indicator for indicating a state of a downlink channel, and may include at least any one of a channel quality indicator (CQI) and a precoding matrix indicator (PMI) for a CSI-RS. Further, a precoding type indicator (PTI), a rank indication (RI), etc., may be included.

The CQI provides information on a link adaptive parameter that can be supported by a UE for a given time. The CQI may indicate a data rate which can be supported by a downlink channel by considering a characteristic of a UE receiver, a signal to interference plus noise ratio (SINR), etc. A BS may determine a modulation (QPSK, 16-QAM, 64-QAM, etc.) and coding rate to be applied to the downlink channel by using the CQI. The CQI may be generated by using various methods. For example, there is a method of directly quantizing and feeding back a channel state, a method of calculating and feeding back an SINR, a method of reporting a state actually applied to the channel such as a modulation coding scheme (MCS). If the CQI is generated on the basis of the MCS, the MCS includes a modulation scheme, a coding scheme, and a coding rate or the like based thereon.

The PMI provides information for a precoding matrix in codebook-based precoding. The PMI is in association with multiple input multiple output (MIMO). When the PMI is fed back in MIMO, it is called closed-loop MIMO.

The RI is information for the number of layers recommended by the UE. That is, the RI indicates the number of streams used in spatial multiplexing. The RI is fed back only when it operates in a MIMO mode in which the UE uses spatial multiplexing. The RI is also in association with one or more CQI feedbacks. That is, a specific RI value is assumed in calculation of the CQI to be fed back. A rank of a channel changes slowly in general in comparison with the CQI, and thus the RI is fed back in a less number of times than the CQI. An RI transmission periodicity may be a multiple of a CQI/PMI transmission periodicity. The RI is given for a full system band, and a frequency selective RI feedback is not supported.

A UE 100 may periodically or aperiodically transmit CSI to a serving cell.

Meanwhile, the serving cell may transmit configuration information regarding the CSI to the UE 100. The configuration information may include csi-subframePatternConfig. The csi-subframePatternConfig may include csi-MeasSubframeSet1 (or csiSet1Pattern) or csi-MeasSubframeSet2 (csiSet2Pattern). The csi-MeasSubframeSet1 (or csiSet1Pattern) indicates a subset of subframes corresponding to an almost blank subframe (ABS) to be described below, and csi-MeasSubframeSet2 (csiSet2Pattern) indicates a subset of non-ABS subframes. This means that an average of a measurement result on the ABS subframe and a measurement result on the non-ABS subframe is used if the csi-subframePatternConfig is released.

Figure 10:
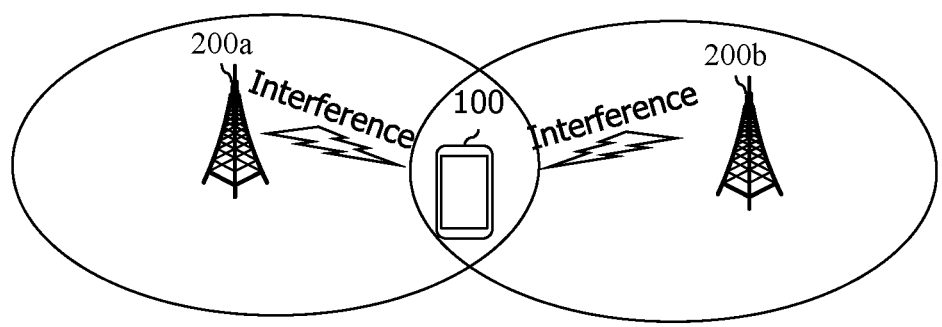
FIG. 10 shows an example of an interference problem between cells.

FIG. 10 shows an example of an interference problem between cells.

As can be seen with reference to FIG. 10, if a UE 100 is located in an overlapping area of a coverage of a first cell 200a and a second cell 200b, a signal of the first cell 200a acts as an interference to a signal of the second cell 200b, and on the contrary, the signal of the second cell 200b acts as an interference to the signal of the first cell 200a.

In the most fundamental method for solving such an interference problem, different frequencies are used between cells. However, since a frequency is a rare and expensive resource, a method of solving the problem by using a frequency division is not much welcomed by a vendor.

Accordingly, 3GPP intends to solve such an inter-cell interference problem through a time division.

Accordingly, recently, an enhanced inter-cell interference coordination (eICIC) is actively under research as one of interference coordination methods in 3GPP.

The time division method introduced in LTE release-10 is called an enhanced inter-cell interference coordination (ICIC) in a sense that it is more enhanced than the conventional frequency division method. In this method, an interfering cell is called an aggressor cell or a primary cell, an interfered cell is defined as a victim cell or a secondary cell, the aggressor cell or the primary cell stops a data transmission in a specific subframe, and a UE is allowed to maintain a connection with the victim cell or the secondary cell in the corresponding subframe. That is, in this method, if heterogeneous cells co-exist, one cell temporarily stops a signal transmission as to a UE which experiences a significantly high interference in a certain area, so that an interference signal is almost not sent.

Meanwhile, a specific subframe in which the data transmission stops is called an almost blank subframe (ABS). No data is transmitted other than essential control information in a subframe corresponding to the ABS. For example, the essential control information is a CRS. Accordingly, data is not transmitted in a subframe to which the ABS is applied, and only a CRS signal is transmitted in symbols 0, 4, 7, and 11.

Figure 11A:
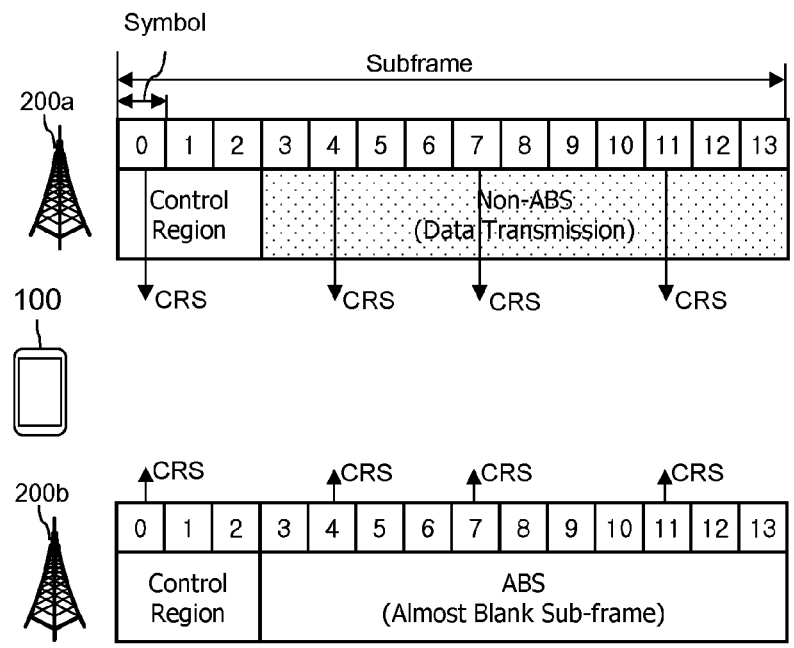
FIG. 11a shows an example of an enhanced inter-cell interference coordination (eICIC) for solving an interference between BSs.

FIG. 11a shows an example of an enhanced inter-cell interference coordination (eICIC) for solving an interference between BSs.

Referring to FIG. 11a, a first cell 200a performs a data transmission in a data region of a subframe as illustrated.

In this case, a second cell 200b applies the eICIC to solve an interference. That is, if the eICIC is applied, a corresponding subframe is operated according to an ABS, and thus no data may be transmitted in the data region.

However, in a subframe operated according to the ABS, only a CRS may be transmitted on symbols 0, 4, 7, and 11.

Figure 11B:
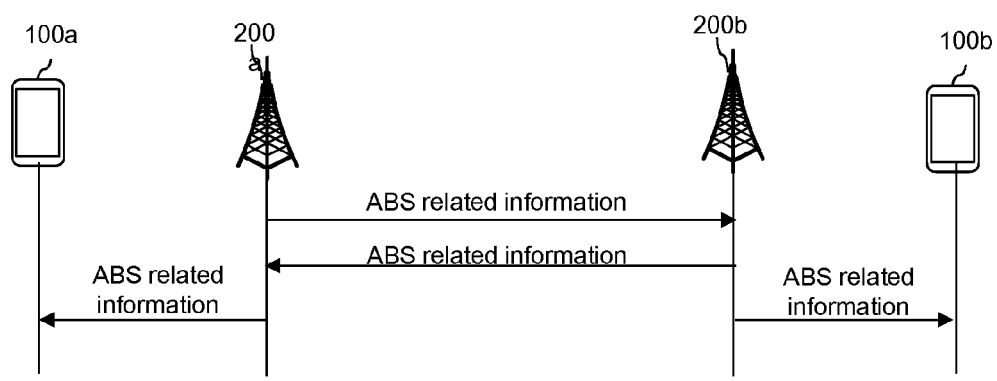
FIG. 11b shows an example of exchanging information related to an almost blank subframe (ABS) subframe.

FIG. 11b shows an example of exchanging information related to an ABS subframe.

As can be seen with reference to FIG. 11b, ABS related information may be exchanged between a first eNodeB 200a and a second eNodeB 200b through an X2 interface.

In addition, each of the first eNodeB 200a and the second eNodeB 200b may deliver the ABS related information to its serving UE 100a/100b.

Each of the first eNodeB 200a and the second eNodeB 200b may configure a measurement subset for its serving UEs 100a/100b on the basis of one or more of its ABS related information and counterpart's ABS relation information, and thereafter may deliver it.

The corresponding cell 200a/200b does not transmit a downlink signal on a downlink subframe which is set to the ABS, or transmits the downlink signal with decreased power. Therefore, a level of an interference having an effect within a coverage of another cell may be decreased in comparison with a downlink subframe which is not set to the ABS. Since the level of the interference may vary depending on whether the subframe is set to the ABS, the UE 100 must perform a measurement only on a predetermined specific subframe.

For this, on the basis of one or more of its ABS pattern information and counterpart's ABS pattern information, each of the cells 200a/200b may instruct its serving UE 100a/100b to perform a measurement only in a specific subframe. This is called a restricted measurement. The instruction may be delivered through a higher layer signal. The higher layer signal may be an RRC signal. The signal may be a CQI-ReportConfig element.

The ABS related information may include ABS information and an ABS status.

First, the ABS information may include one or more of information elements shown in the following table for example. The ABS pattern information is information which represents a subframe to be used as an ABS in a bitmap format. It may be configured with a bitmap of 40 bits in case of FDD and up to 70 bits in case of TDD. For example, in FDD, the 40 bits indicate 40 subframes, and if a bit value is 1, it indicates an ABS, and if the bit value is 0, it indicates a non-ABS subframe. A measurement subset is a subset of ABS pattern information, and is configured with a bitmap of 40 bits in the FDD case and up to 70 bits in the TDD case. Such a measurement subset is to configure a restricted measurement to a corresponding UE.

TABLE 6

| IE | Description |
| --- | --- |
| ABS Pattern Info | At each position of the bitmap, a value "1" indicates 'ABS', and a value "0" indicates 'non-ABS'. A first position of the ABS pattern corresponds to subframe 0 in a radio frame where SFN = 0. The ABS pattern is continuously repeated in all radio frames. The maximum number of subframes is 40. |
| Measurement Subset | It indicates a subset of the ABS Pattern Info, and is used to configure specific measurements for the UE. It indicates |
| ABS Inactive | that interference coordination by means of ABS is not active. |

Next, the ABS status is used to allow a corresponding cell to determine whether to change an ABS pattern. Usable ABS pattern information is a subset of ABS pattern information, and also consists of a bitmap. The Usable ABS pattern information indicates whether a subframe designated as an ABS is properly used for a purpose of an interference mitigation. The downlink ABS status is a ratio of the number of downlink resource blocks (RBs) scheduled in a subframe indicated in the usable ABS pattern information and RBs allocated for a UE which must be protected using the ABS, and indicates how effectively the ABS is utilized in a victim cell according to an original purpose.

TABLE 7

| IE | Description |
| --- | --- |
| DL ABS status | Percentage of used ABS resources. The numerator of the percentage consists of resource blocks within the ABS indicated in the Usable ABS Pattern Info, and the denominator of the percentage is the total number of resource blocks within the ABS indicated in the Usable ABS Pattern Info. |
| Usable ABS Pattern Info | Each position in the bitmap represents a subframe. A value "1" indicates 'ABS' designated as being protected from inter-cell interference, and a value "0" is used for all other subframes. The pattern represented by the bitmap is a subset of, or the same as, the corresponding ABS Pattern Info. |

A measurement subset consisting of a subset of the ABS pattern information is a subframe used as an ABS. Other subframes may autonomously determine whether a corresponding cell is utilized as an ABS according to a traffic load.

As described above, in addition to solving an inter-cell interference problem by using the eICIC method, there may be a method of adding an interference cancellation function to the UE 100. Hereinafter, the method of adding the interference cancellation function will be described.

Figure 12:
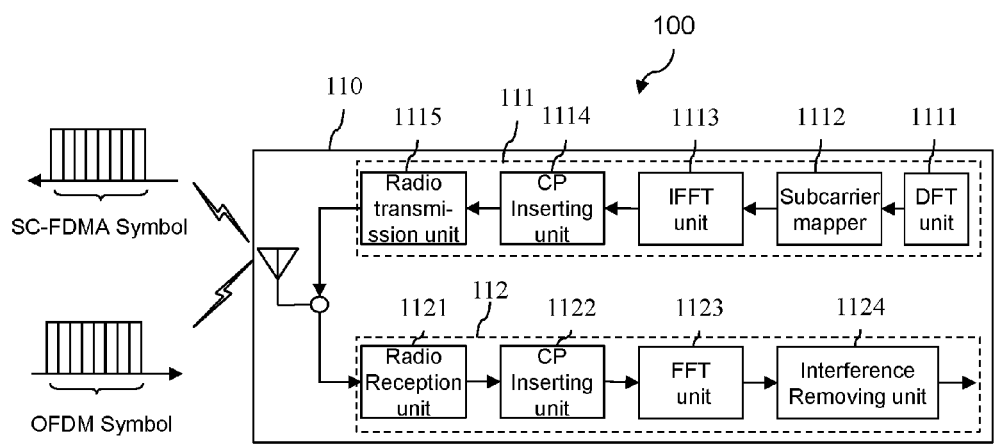
FIG. 12 is a block diagram showing an exemplary structure of a user equipment (UE).

FIG. 12 is a block diagram showing an exemplary structure of a UE.

In long-term evolution (LTE) or LTE-advanced (LTE-A), orthogonal frequency division multiplexing (OFDM) is used in a downlink, whereas single-carrier (SC)-FDMA which is similar to the OFDM is used in an uplink.

The SC-FDMA is also called DFT-spread OFDM (DFT-s OFDM). When using the SC-FDMA transmission scheme, a non-linear distortion duration of a power amplifier is avoidable and thus transmit power efficiency may be increased in a UE in which power consumption is restricted. Accordingly, a user throughput may be increased.

The SC-FDMA is very similar to the OFDM in a sense that a signal is delivered in a divisive manner on a subcarrier by using fast Fourier transform (FFT) and inverse-FFT (IFFT). However, the conventional OFDM has a problem in that signals carried on respective subcarriers on a frequency axis are converted into a time-axis signal by using IFFT. That is, a peak to average power ratio (PAPR) is increased since the IFFT has a form in which the same operation is performed in parallel. To avoid an increase in the PAPR, the SC-FDMA performs IFFT after DFT spreading unlike the OFDM. That is, a transmission method in which IFFT is performed after DFT spreading is called SC-FDMA. Accordingly, the SC-FDMA is also called DFT spread OFDM (DFT-s-OFDM) in the identical meaning.

Advantageously, the SC-FDMA has a structure similar to the OFDM and thus is robust as to a multi-path channel, and also enables an effective usage of a power amplifier by fundamentally solving a disadvantage of the conventional OFDM in which a PAPR is increased through an IFFT operation.

Referring to FIG. 12, a UE 100 includes an RF unit 110. The RF unit 110 includes a transmitting side 111 and a receiving side 112. The transmitting side 111 includes a discrete Fourier transform (DFT) unit 1111, a subcarrier mapper 1112, an IFFT unit 1113, and a CP insertion unit 1114 and a radio transmission unit 1115. The RF unit 110 may further include a scrambling unit (not shown), a modulation mapper (not shown), a layer mapper (not shown), and a layer permutator (not shown) in front of the DFT unit 1111. That is, to avoid an increase in a PAPR as described above, the transmitting side of the RF unit 110 allows information to be first processed by the DFT 1111 before mapping a signal to a subcarrier. A signal subjected to spreading (or precoding as the identical meaning) by the DFT unit 1111 is mapped to a subcarrier via the subcarrier mapper 1112, and thereafter is created as a time-axis signal via the IFFT unit 1113.

That is, a peak-to-average power ratio (PARP) of a time-domain signal after a stage of the IFFT unit 113 is not significantly increased in SC-FDMA according to a correlation of the DFT unit 1111, the subcarrier mapper 1112, and the IFFT unit 1113, and thus it is advantageous in terms of a transmit power efficiency. That is, in the SC-FDMA, a PAPR or a cubic metric (CM) may be decreased.

The DFT unit 1111 performs DFT on the input symbols to output complex-valued symbols. For example, if Ntx symbols are input, a DFT size is Ntx (where Ntx is a natural number). Hereinafter, the DFT unit 1111 is also referred to as a transform precoder. The subcarrier mapper 1112 maps the complex-valued symbols to respective subcarriers in a frequency domain. The complex-valued symbols can be mapped to resource elements corresponding to a resource block allocated for data transmission. Hereinafter, the subcarrier mapper 1112 can also be referred to as a resource element mapper. The IFFT unit 1113 performs IFFT on the input symbols to output a baseband signal for data as a time-domain signal. The CP insertion unit 1114 copies a rear part of the baseband signal for the data and inserts the copy in front of the baseband signal for the data. An inter-symbol interference (ISI) and an inter-carrier interference (ICI) are avoided by CP insertion, and thus orthogonality can be maintained even in a multi-path channel.

Meanwhile, a standardization of LTE-advanced evolved from LTE is actively carried out in 3GPP, and clustered DFT-s-OFDM which permits a non-contiguous resource allocation has been adopted.

The clustered DFS-s OFDM transmission method is modified from the conventional SC-FDMA transmission method, and is a method in which data symbols undergone a precoder are divided into a plurality of sub-blocks and then mapping are performed thereon by separating them from each other in a frequency domain. An important feature of the clustered DFT-s-OFDM method is that a frequency selective resource allocation is enabled, thereby flexibly coping with a frequency selective fading environment.

In this case, in the clustered DFT-s-OFDM method selected as an LTE-advanced uplink access method, a discontinuous resource allocation is allowed unlike the conventional uplink access method, i.e., SC-FDMA. Therefore, uplink data to be transmitted may be divided by several cluster units.

That is, the LTE system is supposed to maintain a single carrier feature in an uplink case, whereas the LTE-A system allows a case where data undergone DFT-precoding is allocated discontinuously in a frequency axis or a PUSCH and a PUCCH are transmitted simultaneously.

On the other hand, the receiving side 112 of the RF unit 110 includes a radio receiving unit 1121, a CP removing unit 1122, an FFT unit 1123, an interference canceling unit 1124, etc. The radio receiving unit 1121, CP removing unit 1122, and FFT unit 1123 of the receiving side perform an opposite function of the radio transmitting unit 1115, the CP inserting unit 1114, and the IFFT unit 1113 in the transmission side 111.

The interference canceling unit 1124 cancels or mitigates an interference included in a received signal.

The receiving side 112 having the interference canceling unit 1124 is called an interference cancellation (IC) receiver or an interference rejection combiner (IRC) receiver and can be implemented in concept by deleting an interference signal from a received signal.

In this case, a complexity of the receiving unit having the interference canceling unit 1124 depends on the maximum number of cells which are targets of an interference cancellation and a type of a signal to be removed.

A primary target signal of the interference cancellation may be a cell-specific reference signal (CRS).

The cancellation of the interference through the interference canceling unit 1124 as described above is also called a further enhanced inter-cell interference coordination (FeICIC).

Figure 13A:
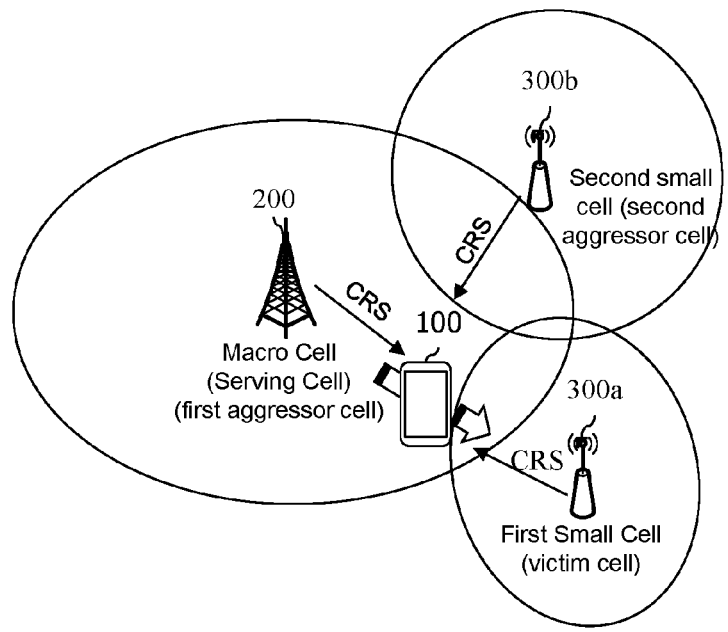
FIG. 13a shows an example of a heterogeneous network including a macro cell and a small cell.
Figure 13B:
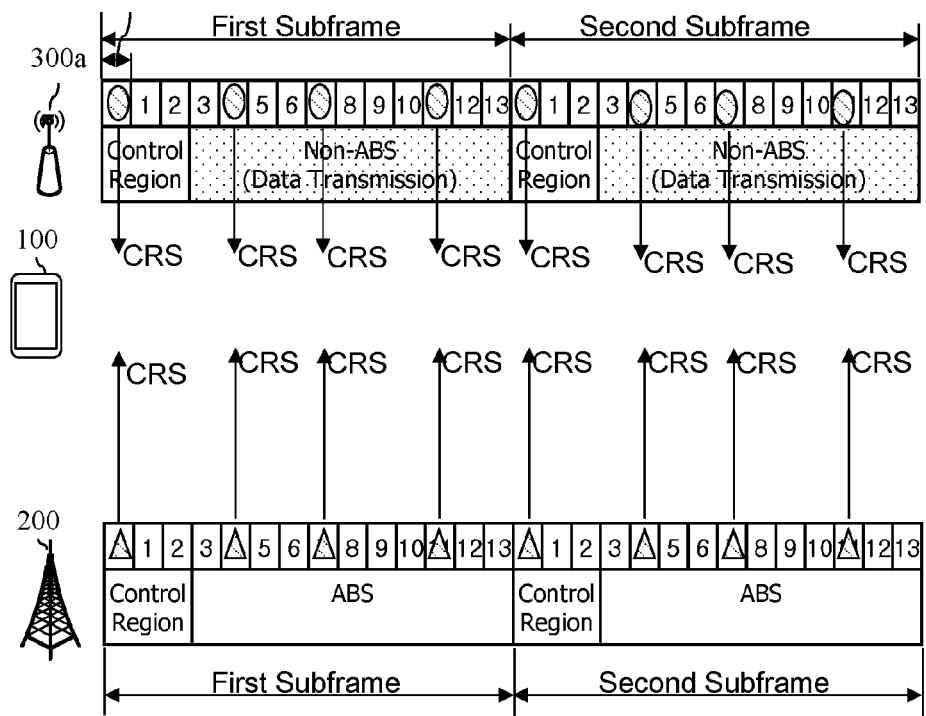
Figure 13C:
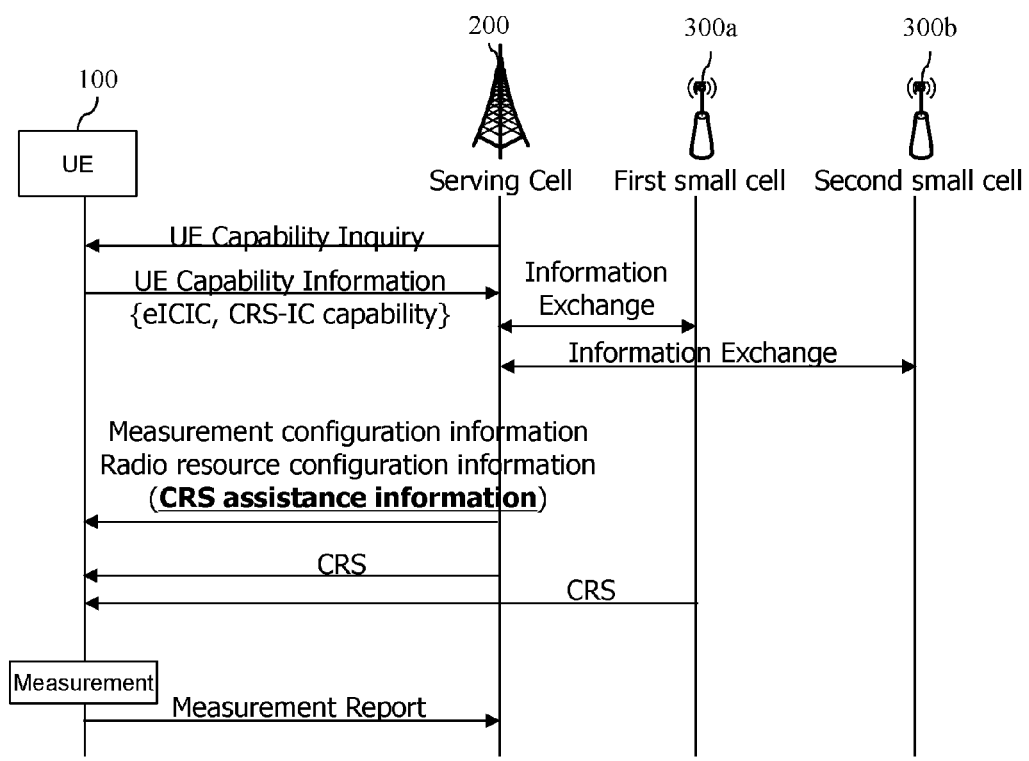
FIG. 13c shows a procedure in which a network supports a CRS interference cancellation of a UE.

FIG. 13a shows an example of a heterogeneous network including a macro cell and a small cell. FIG. 13b shows an example in which a CRS collides in the environment of FIG. 13a. FIG. 13c shows a procedure in which a network supports a CRS interference cancellation of a UE.

In a next-generation communication standard including 3GPP LTE-A, a heterogeneous network in which a small cell (e.g., a pico cell, a femto cell, or a micro cell) having low transmit power coexists with a conventional macro cell 200 is under discussion.

An inter-cell interference problem becomes more serious in such a heterogeneous network since the macro cell and the small cell overlap.

More specifically, referring to FIG. 13a, a first small cell 300a and a second small cell 300b exist around the macro cell 200 corresponding to a serving cell of a UE 100. If the UE 100 is moving to the first small cell 300a, the UE 100 must measure an RSRP by receiving a CRS from the macro cell 200 corresponding to the serving cell, and also must measure an RSRP by receiving a CRS from the first small cell 300a.

However, the CRS of the macro cell 200 corresponding to the serving cell and the CRS of the second small cell 300b cause an interference to the CRS of the first small cell 300a. Therefore, the macro cell 200 corresponding to the serving cell can be seen as a first aggressor cell, the second small cell 300b can be seen as a second aggressor cell, and the first small cell 300a can be seen as a victim cell.

For example, assume that a cell ID of the macro cell 200 corresponding to the serving cell is 0, a cell ID of the first small cell 300a is 6, and a cell ID of the second small cell 300b is 1.

Then, since the cell IDs 0 and 6 are a multiple of 6, as illustrated above with reference to Equation 5, the macro cell 200 corresponding to the serving cell and the first small cell 300a transmit CRSs at the same subcarrier position k, thereby causing a collision of the CRSs. More specifically, as can be seen with reference to FIG. 13b, a first subframe and a second subframe are operated by the first small cell 300a as a non-ABS subframe instead of an ABS subframe. However, even if the first and second subframes are operated by the macro cell 200 corresponding to the serving cell as the ABS subframe, the macro cell 200 corresponding to the serving cell and the first small cell 300a transmit CRSs at the same subcarrier position k on symbols 0, 4, 7, and 11, thereby causing a collision.

On the other hand, a cell ID of the second small cell 300b is 1 which is not a multiple of 6. Therefore, a CRS of the second small cell 300b does not collide with any CRS of any cell (i.e., the serving cell and the first small cell), whereas a CRS of the second small cell 300b causes an interference to a data region of a subframe of the macro cell 200 corresponding to the serving cell and the first small cell 300a.

Eventually, in order for the UE 100 to correctly receive the CRS, an interference cancellation function must be performed. However, in order to drive the CRS interference cancellation function, information regarding a CRS of an aggressor cell which causes an interference needs to be known. If the information regarding the CRS of the aggressor cell is not known, it may be ineffective since the UE 100 must perform a very complex procedure to perform an interference cancellation. Accordingly, the macro cell 200 corresponding to the serving cell may deliver CRS assistance information to the UE 100. This will be described with reference to FIG. 13c.

Referring to FIG. 13c, a macro cell corresponding to a serving cell optionally requests a UE 100 to check a UE capability according to an instruction of a higher layer.

Then, the UE 100 provides UE capability information according to the request. That is, in response to the UE capability check, the UE 100 reports a presence of an eICIC capability and a CRS interference cancellation (IC) capability to a macro cell 200 corresponding to the serving cell. On the other hand, if a radio access capability of the UE 100 is changed, a higher layer of the UE 100 may instruct to a higher layer of the serving cell 200 to perform a capability check request.

In addition, the serving cell 200 confirms whether it is an aggressor cell which causes an interference, through information exchange between a first small cell 300a and a second small cell 300b.

Subsequently, the serving cell 200 delivers to the UE 100 a measurement configuration IE shown in Table 1 and a radio resource configuration IE shown in Table 4. In this case, if the UE 100 has the CRS IC capability, the serving cell 200 may further deliver CRS assistance information (i.e., CRS Assistance Info) in addition to a RadioResource-ConfigDedicated field shown in Table 5. The CRS Assistance Info includes a list for aggressor cells, that is, a cell ID of a cell for transmitting a CRS which collides with a CRS of a cell for performing a measurement, and CRS information of the aggressor cell.

Then, the UE 100 confirms the received information. That is, on subframes designated in measSubframePatternPCell of the received radio resource configuration IE, the UE 100 measures an RSRP by cancelling an interference caused by a CRS from the first small cell 300a and the second small cell 300b upon receiving a CRS from the macro cell 200 corresponding to the serving cell. In addition, on subframes designated in measSubframePatternNeigh of the received radio resource configuration IE, the UE 100 measures an RSRP by cancelling an interference caused by a CRS from the macro cell 200 corresponding to the serving cell upon receiving a CRS from each of the first small cell 300a and the second small cell 300b.

However, there is a problem in that an RSRP measurement result may be different according to whether a subframe for measuring the RSRP is an ABS subframe or a non-ABS subframe.

In addition, a problem may occur since whether the interference cancellation (IC) is performed on subframes designated in the measSubframePatternPCell is not clear. Likewise, a problem may occur since whether the IC is performed on subframes designated in the measSubframe-PatternNeigh is not clear.

Accordingly, in order to solve such a problem, the inventor has observed a measurement capability through a first test (simulation) and has tried to find a solution thereof.

<First Test (Simulation) and Solution Based on the Result>

The inventor has performed the first test (simulation) to observe the measurement capability.

The first test (simulation) is performed under the following conditions.

In subframes designated in the measSubframePatterPCell and the measSubframePatternNeigh, a test for performing an interference cancellation (IC) on a CRS and a test of not performing the IC are both performed.

A test is achieved by performing a CRS IC only in ABS subframes based on the aforementioned csi-MeasSubframeSet1 (csiSet1Pattern), and a test is achieved by not performing the IC on the CRS in a non-ABS subframe based on the csi-MeasSubframeSet2 (csiSet2Pattern).

The CRS IC is performed only for mitigation of an interference caused by an aggressor cell.

RLM is performed only in subframes designated in the measSubframePatternPCell.

A result of the first test (simulation) is expressed by the following table under the aforementioned condition.

In Table 8 below, A1 denotes a first aggressor cell, A2 denotes a second aggressor cell, V denotes a victim cell, and S denotes a serving cell. In addition, right estimation (re) implies that a measurement is well performed, over estimation (oe) implies that an excessive measurement is resulted, and under estimation (ue) implies that an insufficient measurement is resulted. Further, PcellMeasP denotes measSubframePatternPCell indicating a subframe in which a measurement is performed on a serving cell, and NcellMeasP denotes measSubframePatternNeigh indicating a subframe in which a measurement is performed on a neighbour cell. csiSet1 denotes csi-MeasSubframeSet1 (csiSet1Pattern), and csiSet2 denotes csi-MeasSubframeSet2 (csiSet2Pattern).

In addition, in Table 8 below, an ABS pattern is 1100 which indicates that first and second subframes are operated as an ABS subframe, and $3^{rd}$ and $4^{th}$ subframes are operated as a non-ABS subframe. In addition, a scheduler pattern (i.e., SchedulerPattern) is 0011 which indicates that data is not transmitted on the first and second subframes since scheduling is not performed, and data is transmitted on the $3^{rd}$ and $4^{th}$ subframes since scheduling is performed.

In addition, in Table 8 below, 'IC' indicates that a CRS IC is performed, and 'noIC' indicates that the CRS IC is not performed.

TABLE 8

| ABS pattern | 1100 | first aggressor cell (serving cell) | | second aggressor cell | | Victim cell | | Serving cell | | csi-SubframePatternConfig-r10(csiSet2Pattern = 0011) | |
|---|---|---|---|---|---|---|---|---|---|---|---|
| SchedulerPattern | 0011 | $RSRP_{A1}$ | | $RSRP_{A2}$ | | $RSRP_V$ | | $RLM_S$ (SNR) | | CSI (csiSet2) | CSI |
| MeasPset | | IC | noIC | IC | noIC | IC | noIC | IC | noIC | noIC | (release) |
| 1  PcellMeasP | 1100 | re | re | | | | | oe | oe | re | oe |
|    NcellMeasP | 1100 | | | re | re | re | OE | | | | |
| 2  PcellMeasP | 1100 | re | re | | | | | OE | OE | re | oe |
|    NcellMeasP | 0011 | | | re | re | re | oe | | | | |
| 3  PcellMeasP | 0011 | re | re | | | | | oe | re | re | oe |
|    NcellMeasP | 1100 | | | RE | RE | RE | OE | | | | |
| 4  PcellMeasP | 0011 | RE | RE | | | | | OE | RE | re | oe |
|    NcellMeasP | 0011 | | | RE | RE | RE | OE | | | | |

As can be seen from Table 8 above, in the test 1, PcellMeasP (i.e., measSubframePatternPCell) is 1100, that is, a measurement is performed on first and second subframes as to a serving cell, and the measurement is not performed on $3^{rd}$ and $4^{th}$ subframes. In addition, in the test 1, NcellMeasP (i.e., measSubframePatternNeigh) is 1100, that is, a measurement is not performed on first and second subframes as to a neighbour cell (e.g., a first small cell and a second small cell), and the measurement is not performed on $3^{rd}$ and $4^{th}$ subframes. As a result, an $RSRP_{A1}$ for a first aggressor cell (i.e., a serving cell) is well measured independent of whether the IC is performed, and thus it is written as 're' in Table 8. In addition, an $RSRPA_{42}$ for a second aggressor cell (i.e., the second small cell 300b) is well measured independent of whether the IC is performed, and thus it is written as 're' in Table 8. In addition, an $RSRP_V$ for a victim cell (i.e., the first small cell 300a) is well measured when an IC is performed, and thus it is written as 're' in Table 8, whereas it is over estimated when the IC is not performed, and thus it is written as 'oe'. Meanwhile, an $RLM_S$ (i.e., SNR) for a serving cell is over estimated independent of whether the IC is performed, and thus it is written as 'oe'. In addition, channel state information (CSI) is well measured on non-ABS subframes according to csiSet2a and thus it is written as 're', whereas it is over estimated when taking an average of a CSI measurement result of an ABS subframe and a CSI measurement result of a non-ABS subframe according to a release, and thus it is written as 'oe'.

Next, as can be seen from Table 8 above, in the test 2, PcellMeasP (i.e., measSubframePatternPCell) is 1100, that is, a measurement is performed on first and second subframes as to a serving cell, and the measurement is not performed on $3^{rd}$ and $4^{th}$ subframes. In addition, in the test 2, NcellMeasP (i.e., measSubframePatternNeigh) is 0011, that is, a measurement is not performed on first and second subframes as to a neighbour cell (e.g., a first small cell and a second small cell), and the measurement is performed on $3^{rd}$ and $4^{th}$ subframes. A result of the test 2 is the same as the result of the test 1.

Next, as can be seen from Table 8 above, in the test 3, PcellMeasP (i.e., measSubframePatternPCell) is 0011, that is, a measurement is not performed on first and second subframes as to a serving cell, and the measurement is performed on $3^{rd}$ and $4^{th}$ subframes. In addition, in the test 3, NcellMeasP (i.e., measSubframePatternNeigh) is 1100, that is, a measurement is performed on first and second subframes as to a neighbour cell (e.g., the first small cell and the second small cell), and the measurement is not performed on $3^{rd}$ and $4^{th}$ subframes. A result of the test 3 is almost the same as the result of the test 1 and the result of the test 2. However, an $RLM_S$ (i.e., SNR) for the serving cell is over estimated when an IC is performed and thus it is written as 'oe', whereas it is well measured when the IC is not performed and thus it is written as 're'.

Finally, as can be seen from Table 8 above, in the test 4, PcellMeasP (i.e., measSubframePatternPCell) is 0011, that is, a measurement is not performed on first and second subframes as to a serving cell, and the measurement is performed on $3^{rd}$ and $4^{th}$ subframes. In addition, in the test 4, NcellMeasP (i.e., measSubframePatternNeigh) is 0011, that is, a measurement is not performed on first and second subframes as to a neighbour cell (i.e., the first small cell and the second small cell), and the measurement is performed on $3^{rd}$ and $4^{th}$ subframes. A result of the test 4 is the same as the result of the test 3.

The results of the first test performed four times can be summarized as follows.

i) An RSRP for the serving cell 200 is well measured independent of a serving cell measurement pattern (i.e., PcellMeasP or measSubframePatternPcell) or independent of whether an IC is performed.

ii) An RSRP for the second aggressor cell (e.g., the second small cell 300b) is well measured independent of a neighbour cell measurement pattern (i.e., NcellMeasP or measSubframePatternNeigh) and independent of whether the IC is performed.

iii) An RSRP for a victim cell (e.g., the first small cell 300) is well measured when the IC is performed, independent of a measurement pattern (i.e., NcellMeasP or measSubframePatternNeigh).

iv) An RLM for the serving cell 200, that is, SNR, is over estimated with a measurement pattern (i.e., PcellMeasP or measSubframePatternPcell) which is the same as the ABS pattern independent of whether the IC is performed, since a noise on an ABS subframe is measured to be lower than an actual noise on a non-ABS subframe.

v) In addition, an RLM for the serving cell 200, i.e., SNR, is over estimated on a serving cell measurement pattern (i.e., PcellMeasP or measSubframePatternPcell) different from the ABS pattern, since a noise lower than an actual noise is measured when the IC is performed.

vi) An RLM for the serving cell 200, that is, SNR, can be well measured on a serving cell measurement pattern (PcellMeasP or measSubframePatternPcell) different from the ABS pattern when the IC is not performed, since an actual noise is well considered in a non-ABS subframe.

vii) CSI for the serving cell 200 is well measured on a serving cell measurement pattern (i.e., csiset2 or csi-MeasSubframeSet2) different from the ABS pattern.

viii) CSI for the serving cell 200 is over estimated when taking an average of a CSI measurement result of an ABS subframe and a CSI measurement result of a non-ABS subframe according to a release of csiSet2, since a lower noise is measured on an ABS subframe.

From the first test result summarized above, if a serving cell is a first aggressor cell as shown in FIG. 13a and if a CRS of the first aggressor cell collides with a CRS of a victim cell whereas the CRS of the victim cell does not collide with a CSR of a second aggressor cell, it can be seen that an RSRP, an RLM, and CSI are well measured on a serving cell measurement pattern (i.e., PcellMeasP or measSubframePatternPcell) different from an ABS pattern.

Accordingly, a first disclosure of the present application is as follows as to an environment (if a serving cell is a first aggressor cell and a CRS of the first aggressor cell collides with a CRS of a victim cell whereas the CRS of the victim cell does not collide with a CRS of a second aggressor cell) similar to the environment of FIG. 13a.

Proposal 1: A serving cell measurement pattern (i.e., PcellMeasP or measSubframePatternPcell) must be a subset of a non-ABS pattern. That is, a subframe for performing a measurement on a serving cell must be selected from non-ABS subframes.

Proposal 2: A neighbour cell measurement pattern (i.e., NcellMeasP or measSubframePatternNeigh) must be a subset of an ABS pattern. That is, a subframe for performing a measurement on a neighbour cell must be selected from ABS subframes.

Proposal 3: A measurement pattern of an RLM must be a subset of csi-MeasSubframeSet2 or csiSet2. That is, a subframe for performing the RLM must be selected from non-ABS subframes for performing a CSI measurement.

Figure 14:
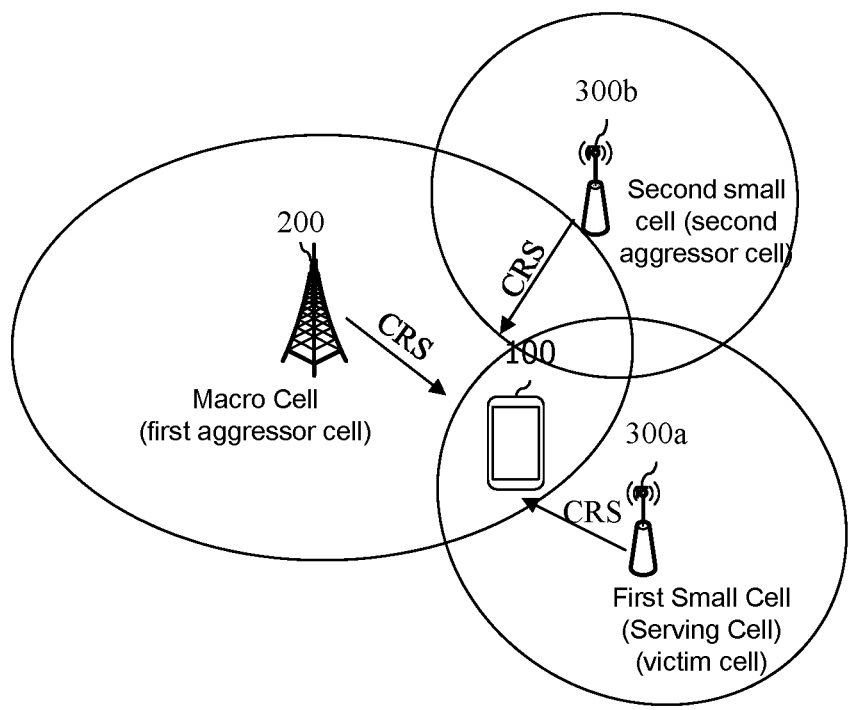

FIG. 14 shows an example of a change in an environment of FIG. 13a.

Referring to FIG. 14, a macro cell 200 and a second small cell 300b exist around a first small cell 300a corresponding to a serving cell of a UE 100. However, if the UE 100 is located in an overlapping area between a coverage of the first small cell corresponding to the serving cell and a coverage of the macro cell 200, a CRS of the macro cell 200 and a CRS of the second small cell 300b cause an interference to the first small cell 300a corresponding to the serving cell. Accordingly, the first small cell 300a corresponding to the serving cell can be seen as a victim cell, the macro cell 200 can be seen as a first aggressor cell, and the second small cell 300b can be seen as a second aggressor cell.

For example, assume that a cell ID of the macro cell 200 corresponding to the first aggressor cell is 0, a cell ID of the first small cell 300a is 6, and a cell ID of the second small cell 300b is 1.

Then, since the cell IDs 0 and 6 are a multiple of 6, as illustrated above with reference to Equation 5, the macro cell 200 corresponding to the first aggressor cell and the first small cell 300a corresponding to the serving cell transmit CRSs at the same subcarrier position k, thereby causing a collision of the CRSs.

Therefore, the UE 100 must perform an interference cancellation (IC) on the CRS. For this, the first small cell 300a corresponding to the serving cell may deliver CRS Assistance Info to the UE 100. The CRS Assistance Info includes a list for aggressor cells, that is, a cell ID of a cell for transmitting a CRS which collides with a CRS of a cell for performing a measurement, and CRS information of the aggressor cell.

However, the aforementioned problem may also occur in the environment of FIG. 14.

Accordingly, in order to solve such a problem, the inventor has observed a measurement capability through a second test (simulation) and has tried to find a solution thereof.

<Second Test (Simulation) and Solution Based on the Result>

The second test (simulation) is performed under the same condition of the first test described above.

A result of the second test (simulation) is shown in the following table.

In addition, in Table 9 below, a scheduler pattern (i.e., SchedulerPattern) is 1100 unlike in Table 8. That is, scheduling is performed on first and second subframes and thus data is transmitted, whereas scheduling is not performed on 3rd and 4th subframes and thus data is not transmitted.

In addition, in Table 9 below, 'IC' indicates that a CRS IC is performed, and
'noIC' indicates that the CRS IC is not performed.

TABLE 9

| | ABS pattern | 1100 | first aggressor cell | | second aggressor cell | | Victim cell (serving cell) | | Serving cell | | csi-SubframePatternConfig-r10(csiSet2Pattern = 0011) | |
|---|---|---|---|---|---|---|---|---|---|---|---|---|
| | SchedulerPattern | 1100 | $RSRP_{A1}$ | | $RSRP_{A2}$ | | $RSRP_V$ | | $RLM_S$ (SNR) | | CSI(csiSet1) | CSI |
| | MeasPset | | IC | noIC | IC | noIC | IC | noIC | IC | noIC | IC | (release) |
| 1 | PcellMeasP | 1100 | | | | | re | oe | re | ue | re | ue |
| | NcellMeasP | 1100 | re | re | re | re | | | | | | |
| 2 | PcellMeasP | 1100 | | | | | re | oe | re | ue | | |
| | NcellMeasP | 0011 | re | re | re | re | | | | | | |
| 3 | PcellMeasP | 0011 | | | | | re | oe | ue | ue | | |
| | NcellMeasP | 1100 | re | re | re | re | | | | | | |
| 4 | PcellMeasP | 0011 | | | | | re | oe | ue | ue | | |
| | NcellMeasP | 0011 | re | re | re | re | | | | | | |

As can be seen from Table 9 above, in the test 1, PcellMeasP (i.e., measSubframePatternPCell) which indicates a subframe for performing a measurement on a serving cell is 1100, and NcellMeasP (i.e., measSubframePatternNeigh) which indicates a subframe for performing a measurement on a neighbour cell is 1100. As a result, an $RSRP_{A1}$ for a first aggressor cell (e.g., the macro cell 200) and an $RSRP_{A2}$ for a second aggressor cell (i.e., the second small cell 300b) are well measured independent of whether an IC is performed, and thus it is written as 're' in Table 9. However, an RSRPV for a victim cell (i.e., the serving cell 300a) is well measured when the IC is performed and thus it is written as 're' in Table 9, whereas it is over estimated when the IC is not performed and thus it is written as 'oe'. Meanwhile, an RLMS for a serving cell (i.e., SRN) is well measured when the IC is performed and thus it is written as 're', whereas it is over estimated when the IC is not performed and thus it is written as 'oe'. In addition, channel state information (CSI) is well measured on ABS subframes according to csiSet1 and thus it is written as 're', whereas it is under estimated when taking an average of a CSI measurement result of an ABS subframe and a CSI measurement result in a non-ABS subframe according to a release, and thus it is written as 'ue'.

Next, in the test 2, as can be seen from Table 9 above, PcellMeasP (i.e., measSubframePatternPCell) which indicates a subframe for performing a measurement on a serving cell is 1100, and NcellMeasP (i.e., measSubframePatternNeigh) which indicates a subframe for performing a measuring a neighbour cell is 0011. A result of the test 2 is the same as the result of the test 1.

Next, in the test 3, as can be seen from Table 9 above, PcellMeasP (i.e., measSubframePatternPCell) which indicates a subframe for performing a measurement on a serving cell is 0011, and NcellMeasP (i.e., measSubframePatternNeigh) which indicates a subframe for performing a measurement on a neighbour cell is 1100. A result of the test 3 is almost the same as the result of the test 1 and the result of the test 2. However, an $RLM_S$ (i.e., SNR) for the serving cell is under estimated independent of whether an IC is performed, and thus it is written as 'ue'.

Finally, as can be seen from Table 9 above, in the test 4, PcellMeasP (i.e., measSubframePatternPCell) which indicates a subframe for performing a measurement on a serving cell is 0011, and NcellMeasP (i.e., measSubframePatternNeigh) which indicates a subframe for performing a measurement on a neighbour cell is 1100. A result of the test 4 is the same as the result of the test 3.

The results of the second test performed four times can be summarized as follows.

i) An RSRPv for the serving cell 300a is well measured independent of a serving cell measurement pattern (PcellMeasP or measSubframePatternPcell) when an IC is performed.

ii) An $RSRP_{A1}$ for the first aggressor cell (e.g., the macro cell 200) is well measured independent of a neighbour cell measurement pattern (i.e., NcellMeasP or measSubframePatternNeigh) and independent of whether the IC is performed.

iii) An $RSRP_{A2}$ for the second aggressor cell (e.g., the second small cell 300b) is well measured independent of a neighbour cell measurement pattern (i.e., NcellMeasP or measSubframePatternNeigh) and independent of whether the IC is performed.

iv) An RLM for the serving cell 300a, i.e., SNR, is well measured on a measurement pattern (i.e., PcellMeasP or measSubframePatternPcell) which is the same as an ABS pattern when the IC is performed.

v) An RLM for the serving cell 300a, i.e., SNR, is under estimated on a measurement pattern (i.e., PcellMeasP or measSubframePatternPcell) which is the same as an ABS pattern when the IC is not performed, since a higher noise than an actual noise is measured.

vi) An RLM for the serving cell 300a, i.e., SNR, may be under estimated on a measurement pattern (i.e., PcellMeasP or measSubframePatternPcell) which is different from an ABS pattern independent of whether the IC is performed, since a higher noise than an actual noise is measured on the ABS subframe.

vii) CSI for the serving cell 300a is well measured on a measurement pattern (i.e., csiset1 or csi-MeasSubframeSet1) which is the same as the ABS pattern.

viii) CSI for the serving cell 300a is under estimated when taking an average of a CSI measurement result of an ABS subframe and a CSI measurement result of a non-ABS subframe according to a release of csiSet1, since a higher noise is measured on a non-ABS subframe.

From the second test result summarized above, if a serving cell is a victim cell as shown in FIG. 14 and a CRS of the serving cell corresponding to the victim cell collides with a CRS of a first aggressor cell but the CRS of the serving cell corresponding to the victim cell does not collide with a CRS of a second aggressor cell, it can be seen that an RSRP, an RLM, and CSI are well measured on a serving cell measurement pattern (i.e., PcellMeasP or measSubframePatternPcell) different from an ABS pattern.

Accordingly, a second disclosure of the present application is as follows as to an environment (if a serving cell is a victim cell and a CRS of the victim cell collides with a CRS of a first aggressor cell whereas the CRS of the victim cell does not collide with a CRS of a second aggressor cell) similar to the environment of FIG. 14.

Proposal 4: A serving cell measurement pattern (i.e., PcellMeasP or measSubframePatternPcell) must be a subset of an ABS pattern. That is, a subframe for performing a measurement on a serving cell must be selected from ABS subframes.

Proposal 5: A neighbour cell measurement pattern (i.e., NcellMeasP or measSubframePatternNeigh) must be a subset of a non-ABS pattern. That is, a subframe for performing a measurement on a neighbour cell must be selected from non-ABS subframes.

Proposal 6: A measurement pattern of an RLM must be a subset of csi-MeasSubframeSet1 or csiSet1. That is, a subframe for performing the RLM must be selected from ABS subframes for performing a CSI measurement.

In addition to the aforementioned proposals 1 to 6, the followings are further proposed in the present application.

Proposal 7: If a serving cell is a first aggressor cell and if a CSI of the first aggressor cell collies with a CRS of a victim cell but the CRS of the victim cell does not collide with a CRS of a second aggressor cell, a subset of a non-ABs subframe pattern must be excluded from a neighbour cell measurement pattern.

Proposal 8: If a serving cell is a victim cell and if a CRS of the victim cell collides with a CRS of a first aggressor cell but the CRS of the victim cell does not collide with a CRS of a second aggressor cell, a subset of an ABS subframe pattern must be excluded from a neighbour cell measurement pattern.

Proposal 9: If a serving cell is a first aggressor cell and if a CRS of the first aggressor cell collides with a CSR of a victim cell but the CRS of the victim cell does not collide with a CRS of a second aggressor cell, a subset of a non-ABS subframe pattern must be applied to a serving cell measurement pattern and a neighbour cell measurement pattern.

Proposal 10: If a serving cell is a victim cell and if a CRS of the victim cell collides with a CRS of a first aggressor cell but the CRS of the victim cell does not collide with a CRS of a second aggressor cell, a subset of an ABS subframe pattern must be applied to a serving cell measurement pattern and a neighbour cell measurement pattern.

Proposal 11: If a serving cell is a first aggressor cell and if a CRS of the first aggressor cell collides with a CRS of a victim cell but the CRS of the victim cell does not collide with a CRS of a second aggressor cell, an RLM measurement pattern must be set to csi-MeasSubframeSet1 or csiSet1.

Proposal 12: If a serving cell is a victim cell and if a CRS of the victim cell collides with a CRS of a first aggressor cell but the CRS of the victim cell does not collide with a CRS of a second aggressor cell, an RLM measurement pattern must be set to csi-SubframePatternConfig.

The aforementioned embodiments of the present invention can be implemented through various means. For example, the embodiments of the present invention can be implemented in hardware, firmware, software, combination of them, etc. Details thereof will be described with reference to the drawing.

Figure 15:
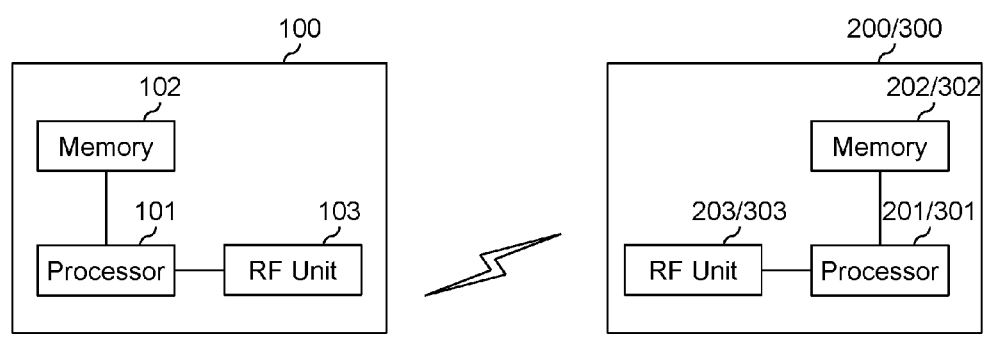
FIG. 15 is a block diagram showing a wireless communication system according to an embodiment of the present invention.

FIG. 15 is a block diagram showing a wireless communication system according to an embodiment of the present invention.

A BS 200/300 includes a processor 201/301, a memory 202/302, and a radio frequency (RF) unit 203/303. The memory 202/302 coupled with the processor 201/301 store a variety of information for driving the processor 201/301. The RF unit 203/303 coupled to the processor 201/301 transmit and/or receive a radio signal. The processor 201/301 implement the proposed functions, procedures, and/or methods. In the aforementioned embodiment, an operation of the BS may be implemented by the processor 201/301.

An MTC device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for assisting measurement of a user equipment (UE), the method performed by a serving cell for the UE and comprising:
   determining, by the serving cell, whether a cell-specific reference signal (CRS) of the serving cell is to collide with a CRS of a second neighbor cell or whether a CRS of a first neighbor cell is not to collide with the CRS of the second neighbor cell, if the serving cell and the first neighbor cell correspond to aggressor cells to the second neighbor cell corresponding to a victim cell;
   generating, by the serving cell, a second measurement subframe pattern based on an almost blank subframe (ABS) pattern in response to the determination; and
   transmitting, by the serving cell to the UE, the second measurement subframe pattern for the first and second neighbor cells.

2. The method of claim 1, further comprising:
   transmitting a first measurement subframe pattern for the serving cell and assistance information on CRSs of the first and second neighbor cells.

3. The method of claim 1, wherein the second measurement subframe pattern is set to a subset of the ABS pattern.

4. The method of claim 1, wherein the second measurement subframe pattern is set to be identical to the ABS pattern.

5. The method of claim 1, wherein a cell identifier (ID) of the serving cell and a cell ID of the second neighbor cell have a same remainder of a modulo 6, whereas a cell ID of the first serving cell has a different remainder of the modulo 6.

6. The method of claim 1, wherein the CRS of the first neighbor cell does not collide with the CRS of the serving cell.

7. A serving cell for assisting measurement of a user equipment (UE), the serving cell comprising:
   a transceiver; and
   a processor configured to:
      determine whether a cell-specific reference signal (CRS) of the serving cell is to collide with a CRS of a second neighbor cell or whether a CRS of a first neighbor cell is not to collide with the CRS of the second neighbor cell, if the serving cell and the first neighbor cell correspond to aggressor cells to the second neighbor cell corresponding to a victim cell,
      generate a second measurement subframe pattern based on an almost blank subframe (ABS) pattern in response to the determination, and
      control the transceiver to transmit, to the UE, the second measurement subframe pattern for the first and second neighbor cells.

8. The serving cell of claim 7, wherein the processor is further configured to:
   control the transceiver to transmit a first measurement subframe pattern for the serving cell and assistance information on CRSs of the first and second neighbor cells.

9. The serving cell of claim 7, wherein the second measurement subframe pattern is set to a subset of the ABS pattern.

10. The serving cell of claim 7, wherein the second measurement subframe pattern is set to be identical to the ABS pattern.

11. The serving cell of claim 7, wherein a cell identifier (ID) of the serving cell and a cell ID of the second neighbor cell have a same remainder of a modulo 6, whereas a cell ID of the first serving cell has a different remainder of the modulo 6.

12. The serving cell of claim 7, wherein the CRS of the first neighbor cell does not collide with the CRS of the serving cell.

* * * * *